United States Patent
Zhang et al.

(10) Patent No.: US 12,004,158 B2
(45) Date of Patent: Jun. 4, 2024

(54) INFORMATION ELEMENT PROCESSING METHOD AND APPARATUS, QUASI-COLOCATION INFORMATION OBTAINING METHOD AND APPARATUS, AND INFORMATION DETERMINING METHOD AND APPARATUS

(71) Applicant: ZTE CORPORATION, Guangdong (CN)

(72) Inventors: Shujuan Zhang, Shenzhen (CN); Zhaohua Lu, Shenzhen (CN); Bo Gao, Shenzhen (CN); Hao Wu, Shenzhen (CN); Yu Ngok Li, Shenzhen (CN); Chuangxin Jiang, Shenzhen (CN); Zhen He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 227 days.

(21) Appl. No.: 17/371,867

(22) Filed: Jul. 9, 2021

(65) Prior Publication Data

US 2022/0174712 A1    Jun. 2, 2022

Related U.S. Application Data

(63) Continuation of application No. PCT/CN2020/071509, filed on Jan. 10, 2020.

(30) Foreign Application Priority Data

Jan. 11, 2019 (CN) .......................... 201910028857.7

(51) Int. Cl.
  *H04W 72/20* (2023.01)
(52) U.S. Cl.
  CPC .................................. *H04W 72/20* (2023.01)

(58) Field of Classification Search
  CPC ........................ H04L 5/0035; H04W 72/563
  (Continued)

(56) References Cited

U.S. PATENT DOCUMENTS

2016/0295418 A1* 10/2016 Yilmaz ................. H04W 16/04
2019/0260452 A1    8/2019 Zhang et al.
(Continued)

FOREIGN PATENT DOCUMENTS

CN    107734514        2/2018
CN    108024365 A      5/2018
(Continued)

OTHER PUBLICATIONS

International Search Report and Written Opinion for PCT Appl. No. PCT/CN2020/071509, dated Apr. 3, 2020 (with English translation, 20 pages).
(Continued)

*Primary Examiner* — Kiet M Doan
(74) *Attorney, Agent, or Firm* — Foley & Lardner LLP

(57) ABSTRACT

Provided are an information element processing method and apparatus. The method includes: in the case where a time interval between control information for scheduling a first-type information element and the first-type information element is less than a predetermined threshold and a predetermined condition is satisfied, acquiring quasi co-location information of the first-type information element according to quasi co-location information of a second-type information element; or in the case where a time interval between control information for scheduling a first-type information element and the first-type information element is less than a predetermined threshold and a predetermined condition is not satisfied, processing the first-type information element in a predetermined processing manner. Further provided are a quasi co-location information acquisition method and apparatus, an information determination method and apparatus, and a storage medium.

9 Claims, 4 Drawing Sheets

(58) Field of Classification Search
USPC .......................................... 370/329, 336, 319
See application file for complete search history.

(56) References Cited

U.S. PATENT DOCUMENTS

| | | | |
|---|---|---|---|
| 2019/0386866 A1* | 12/2019 | Lahbabi | H04L 1/0042 |
| 2020/0267571 A1* | 8/2020 | Park | H04L 5/0051 |
| 2020/0404537 A1* | 12/2020 | Harada | H04L 5/0053 |
| 2021/0004403 A1 | 1/2021 | Liu et al. | |
| 2021/0044403 A1 | 2/2021 | Zhang et al. | |
| 2021/0084623 A1 | 3/2021 | Zhang et al. | |

FOREIGN PATENT DOCUMENTS

| | | |
|---|---|---|
| CN | 108199819 A | 6/2018 |
| CN | 109075825 A | 12/2018 |
| CN | 110535545 A | 12/2019 |

OTHER PUBLICATIONS

VIVO: "Remaining issues on simultaneous reception of DL/UL physical channels and RSs" 3GPP TSG RAN WG1 Meeting #94; R1-1808223; Aug. 24, 2018; Gothenburg, Sweden (7 pages).

Extended European Search Report Appl. No. 20739133.5 dated Aug. 3, 2022, 8 pgs.

Intel Corporation, "On beam management issues for multi-CC operation" 3GPP TSG RAN WG1 Meeting #92, R1-1802393, Mar. 2, 2018, Athens, Greece (7 pages).

First Office Action for CN Appl. No. 202210895583.3, dated Aug. 29, 2023 (with English translation, 10 pages).

Zte et al., "Simultaneous transmission and reception of different channels and reference signals", 3GPP TSG RAN WG1 Meeting #92-bis, R1-1803910, Apr. 20, 2018, Sanya, China (4 pages).

Zte, "Maintenance for beam management", 3GPP TSG RAN WG1 Meeting #94, R1-1808196, Aug. 24, 2018, Gothenburg, Sweden (10 pages).

* cited by examiner

100

First information is associated with second information, or an information type included in reporting information is associated with a manner for determining an interference measurement resource, where the second information includes at least one of the interference measurement resource, a configuration manner of the interference measurement resource or the information type included in the reporting information, the first information includes at least one of spatial receive information, a resource configuration situation or signaling information, and the spatial receive information includes at least one of a spatial receive parameter, a quasi co-location reference signal with respect to a spatial receive parameter or group information of a channel measurement resource

Determine P interference measurement resource sets corresponding to one channel measurement resource set, where the one channel measurement resource set includes N channel measurement resources, and P and N are positive integers greater than or equal to 1

201

Determine an interference measurement resource according to the P interference measurement resource sets

FIG. 2

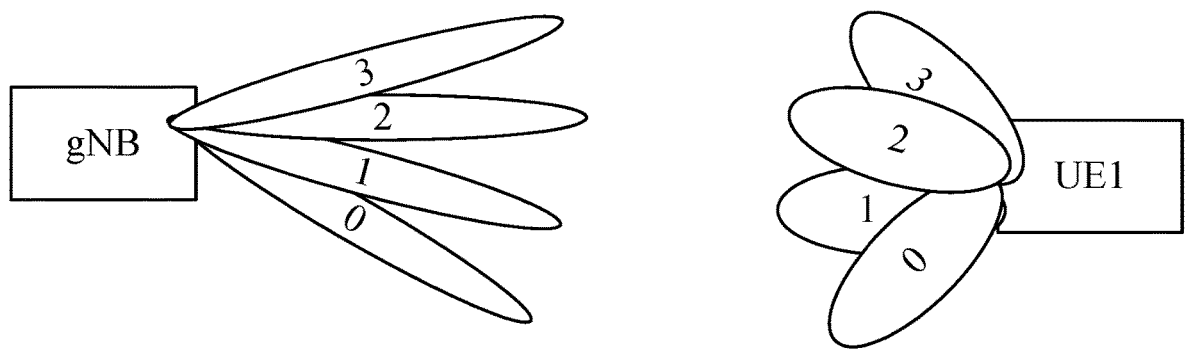

FIG. 3

INFORMATION ELEMENT PROCESSING METHOD AND APPARATUS, QUASI-COLOCATION INFORMATION OBTAINING METHOD AND APPARATUS, AND INFORMATION DETERMINING METHOD AND APPARATUS

CROSS-REFERENCE TO RELATED APPLICATIONS

This application claims the benefit of priority under 35 U.S.C. § 120 as a continuation of PCT Patent Application No. PCT/CN2020/071509, filed on Jan. 10, 2020, which claims priority to Chinese Patent Application No. 201910028857.7 filed on Jan. 11, 2019, the disclosure of each of which is incorporated herein by reference in its entirety.

TECHNICAL FIELD

Embodiments of the present disclosure relate to, but are not limited to, the field of communications, for example, an information element processing method and apparatus, a quasi co-location information acquisition method and apparatus and an information determination method and apparatus.

BACKGROUND

In multi-beam channel state measurement, one transmit beam is generally required for not only channel measurement but also interference measurement. In this case, when one transmit beam needs to correspond to A receive beams at a receiving end and the receiving end can provide the number B (B is greater than or equal to A) of receive beams for the one transmit beam at the same moment, effective channel state measurement can be implemented; when one transmit beam needs to correspond to A receive beams at the receiving end and the receiving end can provide the number B (B is less than A) of receive beams for the one transmit beam at the same moment, the effective channel state measurement cannot be implemented.

SUMMARY

Embodiments of the present disclosure provide an information element processing method and apparatus, a quasi co-location information acquisition method and apparatus and an information determination method and apparatus, which can implement effective channel state measurement in the case where the number B of receive beams that can be provided by a receiving end at the same moment for one transmit beam is less than the number A of receive beams that belong to the receiving end and to which the one transmit beam needs to correspond.

An embodiment of the present disclosure provides an information determination method. The method includes a step described below.

First information is associated with second information, or an information type included in reporting information is associated with a manner for determining an interference measurement resource.

The second information includes at least one of the interference measurement resource, a configuration manner of the interference measurement resource or the information type included in the reporting information.

The first information includes at least one of spatial receive information, a resource configuration situation or signaling information, and the spatial receive information includes at least one of a spatial receive parameter, a quasi co-location reference signal with respect to a spatial receive parameter or group information of a channel measurement resource.

An embodiment of the present disclosure provides an information determination method. The method includes steps described below.

P interference measurement resource sets corresponding to one channel measurement resource set are determined, where the one channel measurement resource set includes N channel measurement resources, and P and N are positive integers greater than or equal to 1.

An interference measurement resource is determined according to the P interference measurement resource sets.

An embodiment of the present disclosure provides an information determination apparatus. The apparatus includes a first determination module.

The first determination module is configured to determine that first information is associated with second information, or an information type included in reporting information is associated with a manner for determining an interference measurement resource.

The second information includes at least one of the interference measurement resource, a configuration manner of the interference measurement resource or the information type included in the reporting information.

The first information includes at least one of spatial receive information, a resource configuration situation or signaling information, and the spatial receive information includes at least one of a spatial receive parameter, a quasi co-location reference signal with respect to a spatial receive parameter or group information of a channel measurement resource.

An embodiment of the present disclosure provides an information determination apparatus. The apparatus includes a second determination module and a third determination module.

The second determination module is configured to determine P interference measurement resource sets corresponding to one channel measurement resource set, where the one channel measurement resource set includes N channel measurement resources, and P and N are positive integers greater than or equal to 1.

The third determination module is configured to determine an interference measurement resource according to the P interference measurement resource sets.

An embodiment of the present disclosure provides an information determination apparatus. The apparatus includes a processor and a computer-readable storage medium, where the computer-readable storage medium stores an instruction which, when executed by the processor, implements any one of the information determination methods described above.

An embodiment of the present disclosure provides a computer-readable storage medium. The computer-readable storage medium stores a computer program which, when executed by a processor, implements steps of any one of the information determination methods described above.

An embodiment of the present disclosure provides an information element processing method. The method includes at least one of steps described below.

In the case where a time interval between control information for scheduling a first-type information element and the first-type information element is less than a predetermined threshold and a predetermined condition is satisfied, quasi co-location information of the first-type information element is acquired according to quasi co-location information of a second-type information element.

In the case where a predetermined condition is not satisfied, it is determined that a time interval between the control information for scheduling the first-type information element and the first-type information element is greater than or equal to a predetermined threshold.

In the case where a time interval between control information for scheduling a first-type information element and the first-type information element is less than a predetermined threshold and a predetermined condition is not satisfied, the first-type information element is processed in a predetermined processing manner.

An embodiment of the present disclosure provides an information element processing apparatus. The apparatus includes a processing module.

The processing module is configured to perform at least one of operations described below.

In the case where a time interval between control information for scheduling a first-type information element and the first-type information element is less than a predetermined threshold and a predetermined condition is satisfied, quasi co-location information of the first-type information element is acquired according to quasi co-location information of a second-type information element.

In the case where a predetermined condition is not satisfied, it is determined that a time interval between the control information for scheduling the first-type information element and the first-type information element is greater than or equal to a predetermined threshold.

In the case where a time interval between control information for scheduling a first-type information element and the first-type information element is less than a predetermined threshold and a predetermined condition is not satisfied, the first-type information element is processed in a predetermined processing manner.

An embodiment of the present disclosure provides an information element processing apparatus. The apparatus includes a processor and a computer-readable storage medium, where the computer-readable storage medium stores an instruction which, when executed by the processor, implements any one of the information element processing methods described above.

An embodiment of the present disclosure provides a computer-readable storage medium. The computer-readable storage medium stores a computer program which, when executed by a processor, implements steps of any one of the information element processing methods described above.

An embodiment of the present disclosure includes that the first information is associated with the second information, or the information type included in the reporting information is associated with the manner for determining the interference measurement resource, where the second information includes at least one of the interference measurement resource, the configuration manner of the interference measurement resource or the information type included in the reporting information, the first information includes at least one of the spatial receive information, the resource configuration situation or the signaling information, and the spatial receive information includes at least one of the spatial receive parameter, the quasi co-location reference signal with respect to the spatial receive parameter or the group information of the channel measurement resource. According to the embodiment of the present disclosure, in the case where the number B of receive beams that can be provided by the receiving end at the same moment for one transmit beam is less than the number A of receive beams that belong to the receiving end and to which the one transmit beam needs to correspond, the first information is associated with the second information or the information type included in the reported information is associated with the manner for determining the interference measurement resource so that the effective channel state measurement is achieved.

Another embodiment of the present disclosure includes: determining the P interference measurement resource sets corresponding to the one channel measurement resource set, where the one channel measurement resource set includes the N channel measurement resources, and P and N are positive integers greater than or equal to 1; and determining the interference measurement resource according to the P interference measurement resource sets. According to the embodiment of the present disclosure, in the case where the number B of receive beams that can be provided by the receiving end at the same moment for one transmit beam is less than the number A of receive beams that belong to the receiving end and to which the one transmit beam needs to correspond, the interference measurement resource is determined based on the P interference measurement resource sets so that the effective channel state measurement is achieved.

Another embodiment of the present disclosure includes at least one of: in the case where the time interval between the control information for scheduling the first-type information element and the first-type information element is less than the predetermined threshold and the predetermined condition is satisfied, acquiring the quasi co-location information of the first-type information element according to the quasi co-location information of the second-type information element; in the case where the predetermined condition is not satisfied, determining that the time interval between the control information for scheduling the first-type information element and the first-type information element is greater than or equal to the predetermined threshold; or in the case where the time interval between the control information for scheduling the first-type information element and the first-type information element is less than the predetermined threshold and the predetermined condition is not satisfied, processing the first-type information element in the predetermined processing manner. According to the embodiment of the present disclosure, a quasi co-location reference signal is acquired in the case where the time interval between the control information for scheduling the first-type information element and the first-type information element is greater than or equal to the predetermined threshold.

BRIEF DESCRIPTION OF DRAWINGS

The drawings are intended to provide a further understanding of solutions of embodiments of the present disclosure, constitute a part of the description, illustrate solutions of embodiments of the present disclosure in conjunction with embodiments of the present disclosure, and do not limit solutions of embodiments of the present disclosure.

FIG. 1 is a flowchart of an information determination method according to an embodiment of the present disclosure.

FIG. 2 is a flowchart of an information determination method according to another embodiment of the present disclosure.

FIG. 3 is a schematic diagram illustrating that different channel measurement beams have different optimal receive beams according to an embodiment of the present disclosure.

DETAILED DESCRIPTION

Figure 4:
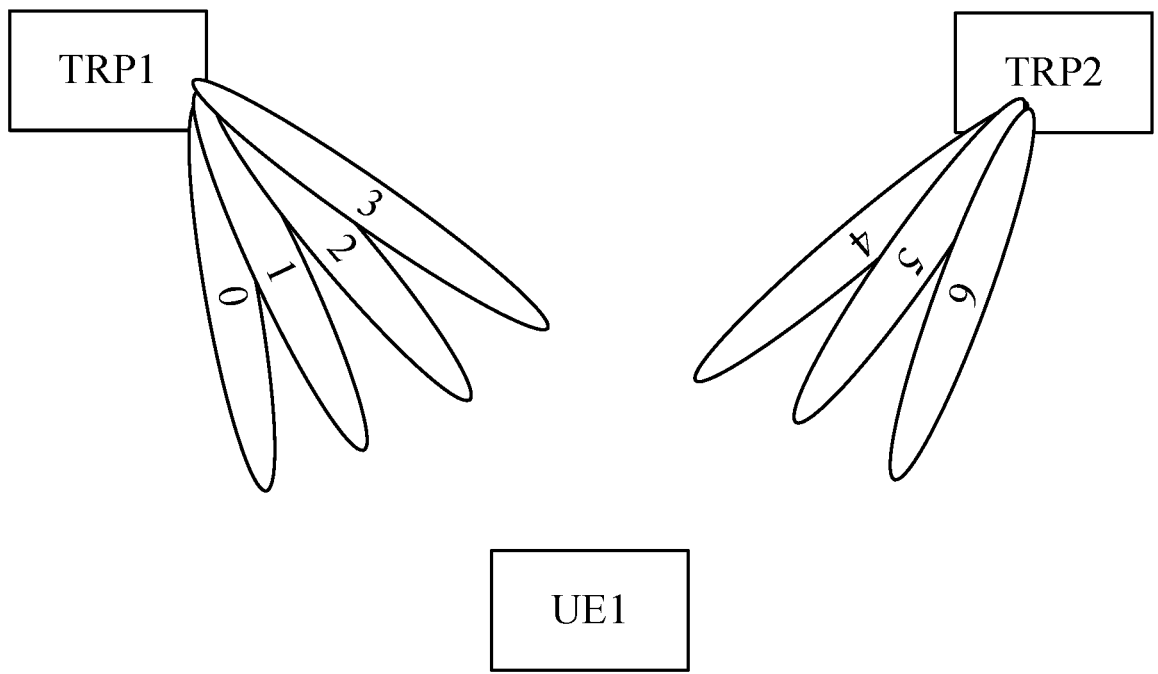
FIG. 4 is a schematic diagram illustrating that channel measurement beams and interference measurement beams are from different transmission-reception points (TRPs) and a receiving end adopts omnidirectional reception according to an embodiment of the present disclosure.

Embodiments of the present disclosure are described in detail hereinafter in conjunction with the drawings. If not in collision, the embodiments of the present disclosure and features therein can be combined with each other in any manner.

The steps illustrated in the flowcharts of the drawings may be performed by a computer system such as a group of computers capable of executing instructions. Moreover, although logical sequences are illustrated in the flowcharts, the steps illustrated or described herein may be performed in sequences different from those described herein in some cases.

In embodiments described hereinafter, a channel measurement resource (CMR) represents a measurement reference signal resource for channel measurement (CM), for example, the CMR includes a resource in a resource setting for CM; and an interference measurement resource (IMR) represents a measurement reference signal resource for interference measurement (IM), for example, the IMR includes a resource in a resource setting for IM, and the interference measurement resource includes a channel state information (CSI)-IM resource and a non-zero power-channel state information-reference signal (NZP-CSI-RS) resource.

In the embodiments described hereinafter, one measurement reference signal resource may be one channel state information-reference signal (CSI-RS) resource or one synchronization signal block (SSB)/physical broadcast channel (PBCH) resource. Of course, if the following solution is used for uplink measurement, one measurement reference signal resource may also be one uplink measurement reference signal resource. In the following description, unless otherwise specified, the "resource" is the measurement reference signal resource.

In the embodiments described hereinafter, one resource setting includes one or more resource sets (that is, channel measurement resource sets or interference measurement resource sets), and one resource set includes one or more measurement reference signal resources.

In the embodiments described hereinafter, the interference measurement resource may be the NZP-CSI-RS resource for interference measurement or the CSI-IM resource for interference measurement. The NZP-CSI-RS resource for interference measurement is configured with a sequence resource, that is, a measurement reference signal so that power of interference is obtained according to the measurement reference signal in the NZP-CSI-RS resource for interference measurement. The CSI-IM resource for interference measurement is configured with no sequence resource, that is, no measurement reference signal and power of a signal received on the CSI-IM resource for interference measurement is the power of interference.

In the embodiments described hereinafter, that two reference signals satisfy a quasi co-location relationship with respect to one type of quasi co-location parameter includes at least one of the following:

The quasi co-location parameter of one reference signal may be acquired according to the quasi co-location parameter of the other reference signal.

The two reference signals have the same quasi co-location reference signal with respect to the one type of quasi co-location parameter. For example, when the quasi co-location reference signal of CSI-RS1 with respect to a spatial receive parameter is CSI-RS3 and the quasi co-location reference signal of CSI-RS2 with respect to the spatial receive parameter is CSI-RS3, CSI-RS1 and CSI-RS2 satisfy the quasi co-location relationship with respect to the spatial receive parameter.

In the embodiments described hereinafter, a CSI-RS resource indicator (CRI) i represents a non-zero power-channel state information-reference signal (NZP-CSI-RS) resource i, where i=0, 1, . . . , which is a resource index.

In the embodiments described hereinafter, channel measurement resources that satisfy the quasi co-location relationship with respect to the spatial receive parameter in the channel measurement resource set are considered to be associated with the same spatial receive information, and channel measurement resources that do not satisfy the quasi co-location relationship with respect to the spatial receive parameter in the channel measurement resource set are considered to be associated with different spatial receive information.

In the embodiments described hereinafter, channel measurement resources that have the same receive information can be received simultaneously by a communication node, that is, channel measurement resources that can be simultaneously received by the communication node are considered to be associated with the same spatial receive information and channel measurement resources that are possible to be unable to be simultaneously received by the communication node are considered to be associated with different spatial receive information. For example, the channel measurement resources that have the same receive information belong to the same channel measurement resource group, and channel measurement resources that belong to different channel measurement resource groups are associated with different receive information, where a terminal can simultaneously receive channel measurement resources in the same group and cannot simultaneously receive channel measurement resources in different groups. Alternatively, the channel measurement resources that have the same receive information belong to different channel measurement resource groups, and the terminal cannot simultaneously receive channel measurement resources in the same group and can simultaneously receive channel measurement resources in different groups. One channel measurement set includes one or more groups.

The concept of the transmission in the embodiments described hereinafter may refer to sending operation and/or receiving operation.

In the embodiments described hereinafter, an association between two parameters includes at least one of the following: a value of one parameter is obtained according to a value of the other parameter; a value range of one parameter is obtained according to a value or a value range of the other parameter; some combinations of values of the two parameters cannot appear at the same time; a parameter 2 associated with a parameter 1 is configured in configuration information of the parameter 1; or a correspondence between the two parameters is determined through signaling information and/or an agreed rule.

Referring to FIG. 1, an embodiment of the present disclosure provides an information determination method. The method includes a step described below.

In step 100, first information is associated with second information, or an information type included in reporting information is associated with a manner for determining an interference measurement resource, where the second information includes at least one of the interference measurement resource, a configuration manner of the interference measurement resource or the information type included in the reporting information, the first information includes at least one of spatial receive information, a resource configuration situation or signaling information, and the spatial receive information includes at least one of a spatial receive parameter, a quasi co-location reference signal with respect to a spatial receive parameter or group information of a channel measurement resource.

In the embodiment of the present disclosure, a receiving end determines, according to spatial receive information of a reference signal, at least one of the interference measurement resource or the configuration manner of the interference measurement resource. The receiving end obtains a spatial receive filter for receiving the reference signal according to the spatial receive information of the reference signal.

In the embodiment of the present disclosure, that the first information is associated with the second information refers to that one of the first information or the second information can be obtained according to the other of the first information or the second information. For example, the second information may be obtained according to the first information. In another example, the first information may be obtained according to the second information.

In the embodiment of the present disclosure, that the information type included in the reporting information is associated with the manner for determining the interference measurement resource includes that one of the information type included in the reporting information or the manner for determining the interference measurement resource can be obtained according to the other of the information type included in the reporting information or the manner for determining the interference measurement resource. For example, the manner for determining the interference measurement resource may be obtained according to the information type included in the reporting information. In another example, the information type included in the reporting information may be obtained according to the manner for determining the interference measurement resource.

In an embodiment of the present disclosure, the group information of the channel measurement resource includes at least one of the number of channel measurement resource groups or the number of resources included in one group.

In an embodiment of the present disclosure, an existence of an association between the spatial receive information and the interference measurement resource represents any one of the following:

determining that the interference measurement resource includes one resource or multiple resources in a first-type set, where the multiple resources are part or all of resources in the first-type set; determining that any two resources among the interference measurement resources satisfy a quasi co-location relationship with respect to the spatial receive parameter;

determining that the interference measurement resource includes one resource or multiple resources in a difference between resources in a first-type set and the channel measurement resource, where the multiple resources are part or all of resources in the difference; or in the case where any two resources in a channel measurement resource set where the channel measurement resource is located satisfy a quasi co-location relationship with respect to the spatial receive parameter, the interference measurement resource including one resource or multiple resources in a difference between the channel measurement resource set and the channel measurement resource, where the multiple resources are part or all of resources in the difference.

The first-type set includes at least one of: a set composed of resources that satisfy the quasi co-location relationship with the channel measurement resource with respect to the spatial receive parameter in a second-type set; a set including one first resource with a correspondence to the channel measurement resource in a third-type set, where the correspondence between the one first resource and the channel measurement resource refers to that a position of the one first resource in the third-type set is associated with a position of the channel measurement resource in the channel measurement resource set, and one piece of position information may be acquired according to the other piece of position information; or a fourth-type set with a correspondence to the channel measurement resource in a first-type setting, where the correspondence between the fourth-type set and the channel measurement resource refers to that the fourth-type set includes the channel measurement resource.

In an embodiment, the method includes at least one of characteristics described below.

The one first resource and the channel measurement resource satisfy the quasi co-location relationship with respect to the spatial receive parameter.

A set composed of resources configured with quasi co-location reference signals with respect to the spatial receive parameter in the third-type set is an empty set.

A repeated sending parameter repetition is configured in the third-type set. In an embodiment, when the number of resources included in the third-type set is greater than 1, the repeated sending parameter repetition is configured.

Resources in the third-type set have the same measurement reference signal parameter information of a predetermined type. The measurement reference signal parameter information of the predetermined type includes at least one of the spatial receive information, a power parameter or quasi co-location information; and the quasi co-location information includes a quasi co-location reference signal associated with one type of quasi co-location parameter and a quasi co-location parameter.

The third-type set is one or more sets except a fifth-type set in a second-type setting, or the third-type set belongs to a second-type setting, where the fifth-type set has a correspondence to the channel measurement resource.

The second-type set includes the channel measurement resource set where the channel measurement resource is located.

A resource in the fourth-type set and the channel measurement resource satisfy the quasi co-location relationship with respect to the spatial receive parameter.

A repeated sending parameter repetition is configured in the fourth-type set. When the number of resources included in the fourth-type set is greater than 1, the repeated sending parameter repetition is configured.

A repeated sending parameter repetition configured in the fourth-type set is off.

Each set in the first-type setting includes the same number of resources.

The second-type setting satisfies at least one of characteristics described below.

Each set in the second-type setting includes the same number of resources.

A set composed of resources configured with quasi co-location reference signals with respect to the spatial receive parameter in each third-type set in the second-type setting is an empty set.

The repeated sending parameter repetition is configured in each third-type set in the second-type setting.

The repeated sending parameter repetition configured in each third-type set in the second-type setting is configured to be on.

Resources in each third-type set in the second-type setting have the same measurement reference signal parameter information of the predetermined type.

The position of the one first resource in the third-type set is associated with a position of the channel measurement resource in a sixth-type set.

Alternatively, a position of the fourth-type set in the first-type setting is associated with a position of the channel measurement resource in a sixth-type set.

The sixth-type set includes any one of: the channel measurement resource set where the channel measurement resource is located; a set composed of resources except a predetermined resource in the channel measurement resource set, where the predetermined resource is acquired according to information or has a correspondence to the third-type set or the fourth-type set; or that each element in the sixth-type set includes one seventh-type set.

Resources in the same seventh-type set correspond to the same spatial receive information and resources in different seventh-type sets correspond to different spatial receive information. The position of the channel measurement resource in the sixth-type set represents an index of a seventh-type set where the channel measurement resource is located.

In an embodiment of the present disclosure, a first number is associated with at least one of the following information: the number of different pieces of spatial receive information in the channel measurement resource set where the channel measurement resource is located; an ability of a communication node to simultaneously provide spatial receive parameters; group information included in the channel measurement resource set; or the number of resources included in the channel measurement resource set.

The communication node is a node that receives the interference measurement resource. The ability of the communication node to simultaneously provide the spatial receive parameters includes the number of spatial receive parameters that can be simultaneously received by the communication node or the number of reference signals that can be simultaneously received by the communication node and do not satisfy the quasi co-location relationship with respect to the spatial receive parameter. In an embodiment, the communication node can simultaneously receive reference signals belonging to the same reference signal group and cannot simultaneously receive reference signals in different reference signal groups, or the communication node can simultaneously receive reference signals belonging to different reference signal groups and cannot simultaneously receive reference signals belonging to the same reference signal group.

The communication node can simultaneously receive reference signal resources belonging to the same group and cannot simultaneously receive reference signal resources belonging to different groups; or the communication node can simultaneously receive reference signal resources belonging to different groups and cannot simultaneously receive reference signal resources belonging to the same group.

The first number includes any one of the number of resources included in the third-type set or the number of fourth-type sets included in the first-type setting.

In an embodiment of the present disclosure, the first number satisfies one of characteristics described below.

The first number is greater than or equal to a second number.

The first number is greater than or equal to a second number minus 1.

The first number is an integer multiple of a second number.

The second number is acquired according to at least one of: the number of different pieces of spatial receive information in the channel measurement resource set, the number of groups included in the channel measurement resource set, the maximum number of measurement reference signal resources included in one group in the channel measurement resource set, a quotient of the number of different pieces of spatial receive information in the channel measurement resource set and the number of pieces of spatial receive information simultaneously provided by the communication node, or the number of resources included in the channel measurement resource set.

In an embodiment of the present disclosure, an association between the spatial receive information and the configuration manner of the interference measurement resource includes that information is associated with the configuration manner of the interference measurement resource.

That is, one of the information or the configuration manner of the interference measurement resource can be obtained according to the other of the information or the configuration manner of the interference measurement resource. For example, the configuration manner of the interference measurement resource may be obtained according to the information. In another example, the information may be obtained according to the configuration manner of the interference measurement resource.

The information includes at least one of: whether a configured transmission configuration indication (TCI) includes at least one TCI state of a quasi co-location reference signal associated with the spatial receive parameter; information about the number of pieces of spatial receive information reported by the communication node; the number of pieces of spatial receive information corresponding to the channel measurement resource set; or the maximum number of pieces of spatial receive information corresponding to the communication node at the same moment.

The communication node is the node that receives the interference measurement resource. The configuration manner of the interference measurement resource includes at least one of the following: different resources in one channel measurement resource set share one interference measurement resource set, or different resources in one channel measurement resource set correspond to one interference measurement resource set, respectively. The number of spatial receive parameters reported by the communication node may also be referred to as the number of receive beams used for receiving an NZP-CSI-RS and reported by the communication node and/or the number of repeated sending resources that the communication node requests an NZP-CSI-RS set to include.

In an embodiment of the present disclosure, the association between the spatial receive information and the configuration manner of the interference measurement resource includes at least one of cases described below.

In a first case, it is determined that the configuration manner of the interference measurement resource is that different resources in one channel measurement resource set share one interference measurement resource set.

In a second case, it is determined that the configuration manner of the interference measurement resource is that each resource in one channel measurement resource set corresponds to a respective one interference measurement resource set.

The first case includes at least one of the following cases: the configured transmission configuration indication includes no transmission configuration indication state of the quasi co-location reference signal associated with the spatial receive parameter; the number of pieces of spatial receive information reported by the communication node is less than or equal to a predetermined value; or the number of pieces of spatial receive information corresponding to the channel measurement resource set is less than or equal to the maximum number of pieces of spatial receive information corresponding to the communication node at the same moment.

The second case includes at least one of the following cases: the configured transmission configuration indication includes the at least one transmission configuration indication state of the quasi co-location reference signal associated with the spatial receive parameter; the number of pieces of spatial receive information reported by the communication node is greater than the predetermined value; or the number of pieces of spatial receive information corresponding to the channel measurement resource set is greater than the maximum number of pieces of spatial receive information corresponding to the communication node at the same moment.

The resource configuration situation includes at least one of: a configuration situation of the number N of channel measurement resources included in the channel measurement resource set, a configuration situation of the number Q of different pieces of spatial receive information corresponding to the channel measurement resource set, a configuration situation of the number P of interference measurement resource sets, a configuration situation of the number D of resources included in the interference measurement resource set or a configuration situation of the repeated sending parameter repetition in the interference measurement resource set.

Where N, P, Q and D are non-negative integers. The configuration situation of the repetition includes at least one of: configuring no repetition, configuring the repetition, configuring the repetition to be on or configuring the repetition to be off.

The number Q of different pieces of spatial receive information corresponding to the channel measurement resource set satisfies at least one of characteristics described below.

Channel measurement resources having the same spatial receive information satisfy the quasi co-location relationship with respect to the spatial receive parameter.

Channel measurement resources having the same spatial receive information can be simultaneously received by the communication node.

Channel measurement resources having the same spatial receive information belong to the same channel measurement resource group, or channel measurement resources having the same spatial receive information belong to different channel measurement resource groups.

One channel measurement resource set includes one or more channel measurement resource groups.

That the first information is associated with the second information includes at least one of cases described below.

In the case where a first value is greater than 1, whether the reporting information includes index information of the interference measurement resource sets is determined according to first signaling information and/or a first predetermined rule.

In the case where a first condition is satisfied, it is determined that the interference measurement resource includes P interference measurement resources, where when P is greater than 1, different interference measurement resources are from different interference measurement resource sets.

In the case where a second condition is satisfied, it is determined that the interference measurement resource includes one resource in one interference measurement resource set.

In the case where a second value is greater than 1, whether the reporting information includes index information of the interference measurement resources is determined according to second signaling information and/or a second predetermined rule.

In the case where a fourth condition is satisfied, it is determined that the interference measurement resource includes one resource in one interference measurement resource set.

In the case where a third condition is satisfied, it is determined that the interference measurement resource includes all resources in one interference measurement resource set.

The first value includes one of P, N or Q, and the second value includes one of D, N or Q.

The method includes at least one of characteristics described below.

The first condition includes at least one of the following: the first value is greater than 1; the reporting information does not include indexes of the interference measurement resource sets; or the repetition in the interference measurement resource set is configured to be on.

The second condition includes at least one of the following: the first value is greater than 1; the reporting information includes the indexes of the interference measurement resource sets; or the repetition in the interference measurement resource set is configured to be on.

The third condition includes at least one of the following: the second value is greater than 1; the reporting information does not include indexes of the interference measurement resources; or the repetition in the interference measurement resource set is configured to be off.

The fourth condition includes at least one of the following: the second value is greater than 1; the reporting information includes the indexes of the interference measurement resources; or the repetition in the interference measurement resource set is configured to be off.

The determined interference measurement resource is an interference measurement resource corresponding to one channel quality.

An association between the resource configuration situation and the information type included in the reporting information along with a configuration manner of an interference resource includes at least one of cases described below.

In response to a fifth condition being satisfied, the repetition in the interference measurement resource set is configured to be on. The fifth condition includes at least one of the following: P is greater than 1; N is greater than 1; Q is greater than 1; or the reporting information includes the indexes of the interference measurement resource sets.

In response to a sixth condition being satisfied, the repetition in the interference measurement resource set is configured to be off. The sixth condition includes at least one of the following: D is greater than 1; N is greater than 1; Q is greater than 1; or the reporting information includes the indexes of the interference measurement resources.

An association between the resource configuration situation and the information type included in the reporting information includes at least one of cases described below.

In the case where the repetition is configured to be on, the reporting information includes the indexes of the interference measurement resource sets.

In the case where the repetition is configured to be off, the reporting information includes indexes of the interference measurement resources in the interference measurement resource set.

In the case where N is greater than 1, the reporting information includes an index of the channel measurement resource in the channel measurement resource set.

In the case where N is equal to 1, the reporting information does not include an index of the channel measurement resource in the channel measurement resource set.

In the case where P or N or Q is greater than 1, the reporting information includes the index information of the interference measurement resource sets.

In the case where P or N or Q is equal to 1, the reporting information does not include the index information of the interference measurement resource sets.

In the case where D or N or Q is greater than 1, the reporting information includes index information of the interference measurement resources in the interference measurement resource set.

In the case where D or N or Q is equal to 1, the reporting information does not include index information of the interference measurement resource in the interference measurement resource set.

The information type included in the reporting information includes at least one of the following cases.

The reporting information includes index information of an interference measurement resource set of a predetermined type.

The reporting information includes index information of an interference measurement resource of a predetermined type in an interference measurement resource set of the predetermined type.

The interference measurement resource of the predetermined type includes at least one of a CSI-IM resource for interference measurement or an NZP-CSI-RS resource for interference measurement.

The information type included in the reporting information includes at least one of the following: one or more information combinations of a CSI-RS resource indicator (CRI)/single-sideband (SSB)Index, indexes of K31 first-type interference measurement resource sets, indexes of K32 second-type interference measurement resource sets, and a signal-to-interference-plus-noise ratio (SINR), where K31 and K32 belong to {0, 1}; one or more information combinations of a CRI/SSBIndex, reference signal received power (RSRP), indexes of K21 first-type interference measurement resource sets, indexes of K22 second-type interference measurement resource sets, and K2 SINRs, where K21 and K22 are non-negative integers and/or at least one of K21 or K22 is equal to K2, and K2 is a positive integer greater than or equal to 1; one or more information combinations of indexes of K41 first-type interference measurement resource sets, indexes of K42 second-type interference measurement resource sets, and an SINR, where K41 and K42 belong to {0, 1}; one or more information combinations of a CRI/SSB index, indexes of K51 first-type interference measurement resources, indexes of K52 second-type interference measurement resources, and an SINR, where K51 and K52 belong to {0, 1}; one or more information combinations of a CRI/SSB index, RSRP, indexes of K61 first-type interference measurement resources, indexes of K62 second-type interference measurement resources, and K6 SINRs, where K61 and K62 are non-negative integers, at least one of K61 or K62 is equal to K6, and K6 is a positive integer greater than or equal to 1; or one or more information combinations of indexes of K71 first-type interference measurement resources, indexes of K72 second-type interference measurement resources, and an SINR, where K71 and K72 belong to {0, 1} and K71+K72 is greater than 0.

The first-type interference measurement resource is the CSI-IM resource for interference measurement, and the second-type interference measurement resource is the NZP-CSI-RS resource for interference measurement.

The information type included in the reporting information includes at least one of the following: one or more information combinations of the CRI or SSBIndex, and the SINR; one or more information combinations of the CRI or SSBIndex, the RSRP, and one or more SINRs; the SINR; one or more information combinations of the CRI or SSBIndex, the indexes of the interference measurement resource sets, and the SINR; one or more information combinations of the CRI or SSBIndex, the RSRP, and K2 interference measurement resource set indexes or the K2 SINRs; one or more information combinations of the indexes of the interference measurement resource sets, and the SINR; one or more information combinations of the CRI or SSBIndex, the indexes of the interference measurement resources, and the SINR; one or more information combinations of the CRI/SSBIndex, the RSRP, K2 interference measurement resource indexes, and the K2 SINRs, where K2 is a positive integer greater than or equal to 1; or one or more information combinations of the interference measurement resource sets and the SINR.

That the first information is associated with the second information includes at least one of cases described below.

In the case where the information type included in the reporting information includes one or more information combinations of the CRI/SSBIndex, the indexes of the interference measurement resource sets, and the SINR, the one or more information combinations are selected from N*P SINRs; where P SINRs corresponding to one channel measurement resource correspond to P interference measurement resource sets, respectively and each SINR corresponds to one channel measurement resource and one resource in one interference measurement resource set.

In the case where the information type included in the reporting information includes one or more information combinations of the CRI or SSBIndex, the RSRP, the K2 interference measurement resource set indexes, and the K2 SINRs, one or more RSRP values are selected from N RSRP values; where each RSRP value corresponds to one channel measurement resource, different RSRP values correspond to different channel measurement resources, and the K2 interference measurement resource set indexes and the K2 SINRs in one information combination are selected from P SINRs; and each of the P SINRs is obtained according to a channel measurement resource corresponding to one RSPR value and one resource in one interference measurement resource set corresponding to the one RSPR value, and P SINRs corresponding to one channel measurement resource correspond to P interference measurement resource sets, respectively.

In the case where the information type included in the reporting information includes one or more information combinations of the indexes of the interference measurement resource sets and the SINR, the one or more information combinations are selected from N*P SINRs; where each SINR corresponds to one channel measurement resource and one resource in one interference measurement resource set, N is equal to 1, and P SINRs corresponding to one channel measurement resource correspond to P interference measurement resource sets, respectively.

In the case where the information type included in the reporting information includes one or more information combinations of the CRI or SSBIndex, the indexes of the interference measurement resources, and the SINR, the one or more information combinations are selected from N*D SINRs; where each SINR corresponds to one channel measurement resource and one resource in one interference measurement resource set, and D SINRs corresponding to one channel measurement resource correspond to D interference measurement resources in the same interference measurement resource set, respectively.

In the case where the information type included in the reporting information includes one or more information combinations of the CRI/or SSBIndex, the RSRP, the K2 interference measurement resource indexes, and the K2 SINRs, one or more RSRP values are selected from N RSRP values; where each RSRP value corresponds to one channel measurement resource, different RSRP values correspond to different channel measurement resources, and the K2 interference measurement resource indexes and the K2 SINRs in one information combination are selected from D SINRs; and each of D SINRs is obtained according to a channel measurement resource corresponding to one RSPR value and one resource in one interference measurement resource set corresponding to the one RSPR value, and D SINRs corresponding to one channel measurement resource correspond to D interference measurement resources in the same interference measurement resource set, respectively.

In the case where the information type included in the reporting information includes one or more information combinations of the indexes of the interference measurement resource sets and the SINR, the one or more information combinations are selected from N*P SINRs; where each SINR corresponds to one channel measurement resource and one resource in one interference measurement resource set, N is equal to 1, and D SINRs corresponding to one channel measurement resource correspond to D interference measurement resources in the same interference measurement resource set, respectively.

The method includes at least one of characteristics described below.

The indexes of the interference measurement resource sets are represented by using $\lceil \log_2 P \rceil$ bits.

The indexes of the interference measurement resources are represented by using $\lceil \log_e D \rceil$ bits.

In an embodiment of the present disclosure, the interference measurement resource is the NZP-CSI-RS resource.

In an embodiment of the present disclosure, the resource or the first resource includes at least one of a reference signal resource, a synchronization signal resource or the interference measurement resource.

In an embodiment of the present disclosure, the determined interference measurement resource is an interference measurement resource corresponding to the one channel measurement resource; or the determined interference measurement resource is an interference measurement resource corresponding to one channel quality.

In an embodiment of the present disclosure, the method includes at least one of characteristics described below.

One piece of channel quality information is obtained according to one of the determined interference measurement resources; or one piece of channel quality information is obtained according to all of the determined interference measurement resources.

One channel quality is obtained according to one channel measurement resource and one or more interference measurement resources of interference measurement resources corresponding to the one channel measurement resource.

One channel measurement resource corresponds to one piece of channel quality information, or the number of pieces of channel quality information corresponding to one channel measurement resource is equal to the number of interference measurement resources corresponding to the one channel measurement resource.

The channel measurement resource satisfies one of characteristics described below.

In the case where one piece of channel quality information is obtained according to one of the determined interference measurement resources, one channel measurement resource corresponds to X pieces of channel quality information, where X is equal to the number of interference measurement resources included in the determined interference measurement resources.

In the case where one piece of channel quality information is obtained according to all of the determined interference measurement resources, one channel measurement resource corresponds to one piece of channel quality information.

The channel quality includes one of a channel quality indicator (CQI) or the signal-to-interference-plus-noise ratio (SINR).

According to the embodiment of the present disclosure, in the case where the number B of receive beams that can be provided by the receiving end at the same moment for one transmit beam is less than the number A of receive beams that belong to the receiving end and to which the one transmit beam needs to correspond, the first information is associated with the second information or the information type included in the reported information is associated with the manner for determining the interference measurement resource so that the effective channel state measurement is achieved.

Referring to FIG. 2, another embodiment of the present disclosure provides an information determination method. The method includes steps described below.

In step 200, P interference measurement resource sets corresponding to one channel measurement resource set are determined, where the one channel measurement resource set includes N channel measurement resources, and P and N are positive integers greater than or equal to 1.

In an embodiment of the present disclosure, the P interference measurement resource sets are associated with spatial receive information, where the spatial receive information includes at least one of a spatial receive parameter or a quasi co-location reference signal with respect to a spatial receive parameter.

In an embodiment of the present disclosure, if it is determined according to signaling information or an agreed rule that one channel measurement setting corresponds to one interference measurement setting, one channel measurement set in the one channel measurement setting corresponds to P interference measurement sets in the one interference measurement setting.

In step 201, an interference measurement resource is determined according to the P interference measurement resource sets.

In an embodiment of the present disclosure, in the case where P is 1, the step in which the interference measurement resource is determined according to the P interference measurement resource sets includes one of steps described below.

It is determined that an interference measurement resource corresponding to each of the N channel measurement resources includes one or more resources in the one interference measurement resource set.

An interference measurement resource corresponding to each of the N channel measurement resources is determined according to a repeated sending parameter repetition in an interference measurement resource set.

The number of channel qualities corresponding to an interference measurement resource corresponding to one channel quality and/or one of the N channel measurement resources is determined according to a repeated sending parameter repetition in an interference measurement resource set.

The step in which the number of channel qualities corresponding to the interference measurement resource corresponding to the one channel quality and/or the one of the N channel measurement resources is determined according to the repetition in the interference measurement resource set includes at least one of steps described below.

In the case where the repetition is configured to be on, it is determined that the interference measurement resource corresponding to the one channel quality is one resource in the one interference measurement resource set.

In the case where the repetition is configured to be on, it is determined that the number of channel qualities corresponding to the one of the N channel measurement resources is 1, where the one channel quality is obtained according to one interference measurement resource with a correspondence to the one channel quality in the interference measurement resource set and the one of the N channel measurement resources.

In the case where the repetition is configured to be off, it is determined that the interference measurement resource corresponding to the one channel quality is one resource in the one interference measurement resource set.

In the case where the repetition is configured to be off, it is determined that the one of the N channel measurement resources corresponds to D pieces of channel quality information, where the D pieces of channel quality information correspond to D interference measurement resources in the one interference measurement resource set, respectively.

In the case where the repetition is configured to be off, it is determined that the interference measurement resource corresponding to the one channel quality is all resources in the one interference measurement resource set.

In the case where the repetition is configured to be off, it is determined that the one of the N channel measurement resources corresponds to one piece of channel quality information, where the one piece of channel quality information is obtained according to D interference measurement resources in the one interference measurement resource set and the one of the N channel measurement resources.

In an embodiment of the present disclosure, in the case where P is greater than 1, the step in which the interference measurement resource is determined according to the P interference measurement resource sets includes one of steps described below.

It is determined that the interference measurement resource corresponding to each of the N channel measurement resources includes one or more resources in one of the P interference measurement resource sets, which has a correspondence to the each of the N channel measurement resources.

It is determined that the interference measurement resource corresponding to each of the N channel measurement resources in the one channel measurement resource set includes one or more second resources, where one of the second resources includes one resource with a correspondence to the each of the N channel measurement resources in one of the P interference measurement resource sets.

It is determined that the interference measurement resource corresponding to each of the N channel measurement resources includes one or more resources in one of the P interference measurement resource sets, which satisfies a quasi co-location relationship with the each of the N channel measurement resources with respect to the spatial receive parameter.

It is determined that the interference measurement resource corresponding to each of the N channel measurement resources in the one channel measurement resource set includes one resource satisfying a quasi co-location relationship with the each of the N channel measurement resources with respect to the spatial receive parameter in one or more of the P interference measurement resource sets.

The step in which the interference measurement resource is determined according to the P interference measurement resource sets includes at least one of steps described below.

In the case where the number of interference measurement resources corresponding to one of the N channel measurement resources is greater than 1, the interference measurement resource corresponding to one channel quality and/or interference measurement resources corresponding to the one of the N channel measurement resources are determined according to the signaling information and/or the agreed rule.

In the case where multiple interference measurement resources are from different interference measurement sets, whether the interference measurement resource corresponding to the one channel quality is one of the multiple interference measurement resources or all the multiple interference measurement resources is determined according to the signaling information and/or the agreed rule.

In the case where multiple interference measurement resources are from the same interference measurement set, whether the interference measurement resource corresponding to the one channel quality is one of the multiple interference measurement resources or all the multiple interference measurement resources is determined according to the signaling information and/or the agreed rule.

P or the number D of resources included in the one interference measurement resource set satisfies one of characteristics described below.

P or D is greater than or equal to N.

P or D is greater than or equal to the number Q of different pieces of spatial receive information in the N channel measurement resources, where Q is a positive integer greater than or equal to 1.

P or D is greater than or equal to the number of channel measurement resource groups included in the channel measurement set.

P or D is greater than or equal to the number of resources included in a channel measurement resource group, where the channel measurement set includes one or more channel measurement resource groups.

In the case where P is greater than 1, the step in which the interference measurement resource is determined according to the P interference measurement resource sets includes one of steps described below.

It is determined that the interference measurement resource corresponding to each of the N channel measurement resources includes one or more resources in one of the P interference measurement resource sets, which has the correspondence to the each of the N channel measurement resources.

It is determined that the interference measurement resource corresponding to each of the N channel measurement resources in the one channel measurement resource set includes one or more second resources, where one of the second resources includes one resource with the correspondence to the each of the N channel measurement resources in one of the P interference measurement resource sets, and different second resources correspond to different interference measurement resource sets.

It is determined that the interference measurement resource corresponding to each of the N channel measurement resources includes one or more resources in one of the P interference measurement resource sets, which satisfies the quasi co-location relationship with the each of the N channel measurement resources with respect to the spatial receive parameter.

It is determined that the interference measurement resource corresponding to each of the N channel measurement resources in the one channel measurement resource set includes one or more third resources, where one of the third resources includes one resource satisfying the quasi co-location relationship with the each of the N channel measurement resources with respect to the spatial receive parameter in one of the P interference measurement resource sets, and different third resources correspond to different interference measurement resource sets.

The method includes at least one of characteristics described below.

The one of the P interference measurement resource sets, which has the correspondence to the each of the N channel measurement resources, is determined according to first signaling information and/or a first predetermined rule.

One resource with the correspondence to the each of the N channel measurement resources in each of the P interference measurement resource sets is determined according to second signaling information and/or a second predetermined rule.

In an embodiment of the present disclosure, the step in which the interference measurement resource is determined according to the P interference measurement resource sets includes at least one of steps described below.

In the case where the number of interference measurement resources corresponding to one of the N channel measurement resources is greater than 1, the interference measurement resource corresponding to one channel quality and/or the number of channel qualities corresponding to the one of the N channel measurement resources are determined according to the signaling information and/or the agreed rule.

Whether the interference measurement resource corresponding to the one channel quality is one of the multiple interference measurement resources or all the multiple interference measurement resources is determined according to the signaling information and/or the agreed rule.

Whether the number of channel qualities corresponding to the one of the N channel measurement resources is equal to 1 or the number of the multiple interference measurement resources is determined according to the signaling information and/or the agreed rule.

A manner for acquiring a predetermined rule includes at least one of the following information: the number N of the channel measurement resources included in the one channel measurement resource set; the number Q of different pieces of spatial receive information in the one channel measurement resource set; the number P of the interference measurement resource sets; the number D of resources included in each of the P interference measurement resource sets; or a configuration situation of a repeated sending parameter repetition in each of the P interference measurement resource sets.

The configuration situation of the repetition includes configuring no repetition, configuring the repetition, configuring the repetition to be on or configuring the repetition to be off.

In an embodiment of the present disclosure, the step in which the interference measurement resource is determined according to the P interference measurement resource sets includes a step described below.

It is determined that the interference measurement resource corresponding to each of the N channel measurement resources includes P measurement reference signal resources, where different measurement reference signal resources of the P measurement reference signal resources are from different interference measurement resource sets of the P interference measurement resource sets.

In an embodiment of the present disclosure, the P interference measurement resource sets satisfy at least one of characteristics described below.

The repeated sending parameter repetition is configured in each of the P interference measurement resource sets.

A set composed of interference measurement resources configured with quasi co-location reference signals with respect to the spatial receive parameter in each of the P interference measurement resource sets is an empty set.

Different interference measurement resource sets of the P interference measurement resource sets include the same number of resources.

The P interference measurement resource sets have the same time domain characteristic, where the time domain characteristic includes being periodic, being aperiodic or being semi-persistent.

The number of resources included in each of the P interference measurement resource sets is greater than or equal to N.

The number of resources included in each of the P interference measurement resource sets is greater than or equal to the number Q of different spatial receive parameters in the N channel measurement resources, where Q is a positive integer greater than or equal to 1.

The P interference measurement resource sets belong to one interference measurement resource setting corresponding to the one channel measurement resource set.

The P interference measurement resource sets are of the same type. A type of a first interference measurement resource set includes any one or more of a CSI-IM resource set for interference measurement or an NZP-CSI-RS resource set for interference measurement. A type of one interference measurement resource set includes any one of the following: the number of channel measurement resources corresponding to the one interference measurement resource set in the one channel measurement resource set is greater than a predetermined value, or the number of channel measurement resources corresponding to the one interference measurement resource set in the one channel measurement resource set is less than or equal to a predetermined value.

The P interference measurement resource sets are associated with the spatial receive information, where the spatial receive information includes at least one of the spatial receive parameter or the quasi co-location reference signal with respect to the spatial receive parameter.

The method includes at least one of characteristics described below.

The repeated sending parameter repetition in each of the P interference measurement resource sets is configured to be on.

The repeated sending parameter repetition in each of the P interference measurement resource sets is configured to be off.

A manner for determining an interference resource is associated with the repeated sending parameter repetition in each of the P interference measurement resource sets.

The one interference measurement resource setting includes at least one of a CSI-IM resource setting for interference measurement or an NZP-CSI-RS resource setting for interference measurement.

P or the number D of resources included in each of the P interference measurement resource sets is determined according to at least one of the following information: the number of resources included in the channel measurement resource set; the number of different pieces of spatial receive information in the one channel measurement resource set; the number of channel measurement resource groups; the number of resources included in the channel measurement resource group; whether a configured transmission configuration indication (TCI) includes at least one TCI state of a quasi co-location reference signal associated with the spatial receive parameter; or information about the number of pieces of spatial receive information reported by a communication node, where the communication node is a node that receives the interference measurement resource.

The number of spatial receive parameters reported by the communication node may also be referred to as the number of receive beams used for receiving an NZP-CSI-RS and reported by the communication node and/or the number of repeated sending resources that the communication node requests an NZP-CSI-RS set to include.

The one channel measurement resource set includes one or more channel measurement resource groups.

The method satisfies at least one of characteristics described below.

In the case where the one channel measurement resource set corresponds to the one interference measurement resource set, any two resources in the one channel measurement resource set satisfy the quasi co-location relationship with respect to the spatial receive parameter.

In the case where any two resources in the one channel measurement resource set satisfy the quasi co-location relationship with respect to the spatial receive parameter, the one channel measurement resource set corresponds to the one interference measurement resource set.

An intersection between the one channel measurement resource set and each of the P interference measurement resource sets is non-empty.

One measurement reference signal resource has the same spatial receive information as a channel measurement resource and as an interference measurement resource.

Spatial receive information of one measurement reference signal resource as a channel measurement resource and spatial receive information of the one measurement reference signal resource as an interference measurement resource are associated with one piece of group information. A group associated with a resource includes at least one of a resource group to which the resource belongs, a control channel resource group to which a control channel for scheduling the resource belongs, a reference signal group where a quasi co-location reference signal of the resource is located or an antenna group of the communication node corresponding to the resource. The group information includes a group index.

One channel quality is obtained according to one of the N channel measurement resources and one or more interference measurement resources of interference measurement resources corresponding to the one of the N channel measurement resources.

One of the N channel measurement resources corresponds to one piece of channel quality information, or the number of pieces of channel quality information corresponding to one of the N channel measurement resources is equal to the number of interference measurement resources corresponding to the one of the N channel measurement resources.

According to the embodiment of the present disclosure, in the case where the number B of receive beams that can be provided by a receiving end at the same moment for one transmit beam is less than the number A of receive beams that belong to the receiving end and to which the one transmit beam needs to correspond, the interference measurement resource is determined based on the P interference measurement resource sets so that effective channel state measurement is achieved.

Another embodiment of the present disclosure provides an information determination apparatus. The apparatus includes a first determination module.

The first determination module is configured to determine that first information is associated with second information or that an information type included in reporting information is associated with a manner for determining an interference measurement resource, where the second information includes at least one of the interference measurement resource, a configuration manner of the interference measurement resource or the information type included in the reporting information, the first information includes at least one of spatial receive information, a resource configuration situation or signaling information, and the spatial receive information includes at least one of a spatial receive parameter, a quasi co-location reference signal with respect to a spatial receive parameter or group information of a channel measurement resource.

In the embodiment of the present disclosure, that the first information is associated with the second information refers to that one of the first information or the second information can be obtained according to the other of the first information or the second information. For example, the second information may be obtained according to the first information. In another example, the first information may be obtained according to the second information.

In the embodiment of the present disclosure, that the information type included in the reporting information is associated with the manner for determining the interference measurement resource includes that one of the information type included in the reporting information or the manner for determining the interference measurement resource can be obtained according to the other of the information type included in the reporting information or the manner for determining the interference measurement resource. For example, the manner for determining the interference measurement resource may be obtained according to the information type included in the reporting information. In another example, the information type included in the reporting information may be obtained according to the manner for determining the interference measurement resource.

In an embodiment of the present disclosure, the group information of the channel measurement resource includes at least one of the number of channel measurement resource groups or the number of resources included in one group.

In an embodiment of the present disclosure, the first determination module is configured to implement an association between the spatial receive information and the interference measurement resource in any one of manners described below.

It is determined that the interference measurement resource includes one resource or multiple resources in a first-type set, where the multiple resources are part or all of resources in the first-type set.

It is determined that any two resources among the interference measurement resources satisfy a quasi co-location relationship with respect to the spatial receive parameter.

It is determined that the interference measurement resource includes one resource or multiple resources in a difference between resources in a first-type set and the channel measurement resource, where the multiple resources are part or all of resources in the difference.

In the case where any two resources in a channel measurement resource set where the channel measurement resource is located satisfy a quasi co-location relationship with respect to the spatial receive parameter, the interference measurement resource includes one resource or multiple resources in a difference between the channel measurement resource set and the channel measurement resource, where the multiple resources are part or all of resources in the difference.

The first-type set includes at least one of: a set composed of resources that satisfy the quasi co-location relationship with the channel measurement resource with respect to the spatial receive parameter in a second-type set; a set including one first resource with a correspondence to the channel measurement resource in a third-type set, where the correspondence between the one first resource and the channel measurement resource refers to that a position of the one first resource in the third-type set is associated with a position of the channel measurement resource in the channel measurement resource set, and one piece of position information may be acquired according to the other piece of position information; or a fourth-type set with a correspondence to the channel measurement resource in a first-type setting, where the correspondence between the fourth-type set and the channel measurement resource refers to that the fourth-type set includes the channel measurement resource.

The method includes at least one of characteristics described below.

The one first resource and the channel measurement resource satisfy the quasi co-location relationship with respect to the spatial receive parameter.

A set composed of resources configured with quasi co-location reference signals with respect to the spatial receive parameter in the third-type set is an empty set.

A repeated sending parameter repetition is configured in the third-type set. Specifically, when the number of resources included in the third-type set is greater than 1, the repeated sending parameter repetition is configured.

Resources in the third-type set have the same measurement reference signal parameter information of a predetermined type. The measurement reference signal parameter information of the predetermined type includes at least one of the spatial receive information, a power parameter or quasi co-location information; and the quasi co-location information includes a quasi co-location reference signal associated with one type of quasi co-location parameter and a quasi co-location parameter.

The third-type set is one or more sets except a fifth-type set in a second-type setting, or the third-type set belongs to a second-type setting, where the fifth-type set has a correspondence to the channel measurement resource.

The second-type set includes the channel measurement resource set where the channel measurement resource is located.

A resource in the fourth-type set and the channel measurement resource satisfy the quasi co-location relationship with respect to the spatial receive parameter.

A repeated sending parameter repetition is configured in the fourth-type set. When the number of resources included in the fourth-type set is greater than 1, the repeated sending parameter repetition is configured.

A repeated sending parameter repetition configured in the fourth-type set is off.

Each set in the first-type setting includes the same number of resources.

The second-type setting satisfies at least one of characteristics described below.

Each set in the second-type setting includes the same number of resources.

A set composed of resources configured with quasi co-location reference signals with respect to the spatial receive parameter in each third-type set in the second-type setting is an empty set.

The repeated sending parameter repetition is configured in each third-type set in the second-type setting.

The repeated sending parameter repetition configured in each third-type set in the second-type setting is configured to be on.

Resources in each third-type set in the second-type setting have the same measurement reference signal parameter information of the predetermined type.

The position of the one first resource in the third-type set is associated with a position of the channel measurement resource in a sixth-type set.

Alternatively, a position of the fourth-type set in the first-type setting is associated with a position of the channel measurement resource in a sixth-type set.

The sixth-type set includes any one of: the channel measurement resource set where the channel measurement resource is located; a set composed of resources except a predetermined resource in the channel measurement resource set, where the predetermined resource is acquired according to information or has a correspondence to the third-type set or the fourth-type set; or that each element in the sixth-type set includes one seventh-type set.

Resources in the same seventh-type set correspond to the same spatial receive information and resources in different seventh-type sets correspond to different spatial receive information. The position of the channel measurement resource in the sixth-type set represents an index of a seventh-type set where the channel measurement resource is located.

In an embodiment of the present disclosure, a first number is associated with at least one of the following information: the number of different pieces of spatial receive information in the channel measurement resource set where the channel measurement resource is located; an ability of a communication node to simultaneously provide spatial receive parameters; group information included in the channel measurement resource set; or the number of resources included in the channel measurement resource set.

The communication node is a node that receives the interference measurement resource. The ability of the communication node to simultaneously provide the spatial receive parameters includes the number of spatial receive parameters that can be simultaneously received by the communication node or the number of reference signals that can be simultaneously received by the communication node and do not satisfy the quasi co-location relationship with respect to the spatial receive parameter. In an embodiment, the communication node can simultaneously receive reference signals belonging to the same reference signal group and cannot simultaneously receive reference signals in different reference signal groups, or the communication node can simultaneously receive reference signals belonging to different reference signal groups and cannot simultaneously receive reference signals belonging to the same reference signal group.

The communication node can simultaneously receive reference signal resources belonging to the same group and cannot simultaneously receive reference signal resources belonging to different groups; or the communication node can simultaneously receive reference signal resources belonging to different groups and cannot simultaneously receive reference signal resources belonging to the same group.

The first number includes any one of the number of resources included in the third-type set or the number of fourth-type sets included in the first-type setting.

In an embodiment of the present disclosure, the first number satisfies one of characteristics described below.

The first number is greater than or equal to a second number.

The first number is greater than or equal to a second number minus 1.

The first number is an integer multiple of a second number.

The second number is acquired according to at least one of the number of different pieces of spatial receive information in the channel measurement resource set, the number of groups included in the channel measurement resource set, the maximum number of measurement reference signal resources included in one group in the channel measurement resource set, a quotient of the number of different pieces of spatial receive information in the channel measurement resource set and the number of pieces of spatial receive information simultaneously provided by the communication node, or the number of resources included in the channel measurement resource set.

In an embodiment of the present disclosure, the first determination module is configured to implement an association between the spatial receive information and the configuration manner of the interference measurement resource in a manner described below.

Information is associated with the configuration manner of the interference measurement resource. That is, one of the information or the configuration manner of the interference measurement resource can be obtained according to the other of the information or the configuration manner of the interference measurement resource. For example, the configuration manner of the interference measurement resource may be obtained according to the information. In another example, the information may be obtained according to the configuration manner of the interference measurement resource.

The information includes at least one of: whether a configured transmission configuration indication includes at least one transmission configuration indication state of a quasi co-location reference signal associated with the spatial receive parameter; or information about the number of pieces of spatial receive information reported by the communication node.

The communication node is the node that receives the interference measurement resource. The configuration manner of the interference measurement resource includes at least one of the following: different resources in one channel measurement resource set share one interference measurement resource set, or different resources in one channel measurement resource set correspond to one interference measurement resource set, respectively. The number of spatial receive parameters reported by the communication node may also be referred to as the number of receive beams used for receiving an NZP-CSI-RS and reported by the communication node and/or the number of repeated sending resources that the communication node requests an NZP-CSI-RS set to include.

In an embodiment of the present disclosure, the first determination module is configured to implement the association between the spatial receive information and the configuration manner of the interference measurement resource in at least one of manners described below.

In a first case, it is determined that the configuration manner of the interference measurement resource is that different resources in one channel measurement resource set share one interference measurement resource set.

In a second case, it is determined that the configuration manner of the interference measurement resource is that each resource in one channel measurement resource set corresponds to a respective one interference measurement resource set.

The first case includes at least one of the following cases: the configured transmission configuration indication includes no transmission configuration indication state of the quasi co-location reference signal associated with the spatial receive parameter; the number of pieces of spatial receive information reported by the communication node is less than or equal to a predetermined value; or the number of pieces of spatial receive information corresponding to the channel measurement resource set is less than or equal to the maximum number of pieces of spatial receive information corresponding to the communication node at the same moment.

The second case includes at least one of the following cases: the configured transmission configuration indication includes the at least one transmission configuration indication state of the quasi co-location reference signal associated with the spatial receive parameter; the number of pieces of spatial receive information reported by the communication node is greater than the predetermined value; or the number of pieces of spatial receive information corresponding to the channel measurement resource set is greater than the maximum number of pieces of spatial receive information corresponding to the communication node at the same moment.

The resource configuration situation includes at least one of: a configuration situation of the number N of channel measurement resources included in the channel measurement resource set, a configuration situation of the number Q of different pieces of spatial receive information corresponding to the channel measurement resource set, a configuration situation of the number P of interference measurement resource sets, a configuration situation of the number D of resources included in the interference measurement resource set or a configuration situation of the repeated sending parameter repetition in the interference measurement resource set.

N, P, Q and D are non-negative integers. The configuration situation of the repetition includes at least one of: configuring no repetition, configuring the repetition, configuring the repetition to be on or configuring the repetition to be off.

The number Q of different pieces of spatial receive information corresponding to the channel measurement resource set satisfies at least one of characteristics described below.

Channel measurement resources having the same spatial receive information satisfy the quasi co-location relationship with respect to the spatial receive parameter.

Channel measurement resources having the same spatial receive information can be simultaneously received by the communication node.

Channel measurement resources having the same spatial receive information belong to the same channel measurement resource group, or channel measurement resources having the same spatial receive information belong to different channel measurement resource groups.

One channel measurement set includes one or more channel measurement resource groups.

The first determination module is configured to implement an association between the first information and the second information in at least one of manners described below.

In the case where a first value is greater than 1, whether the reporting information includes index information of the interference measurement resource sets is determined according to first signaling information and/or a first predetermined rule.

In the case where a first condition is satisfied, it is determined that the interference measurement resource includes P interference measurement resources, where when P is greater than 1, different interference measurement resources are from different interference measurement resource sets.

In the case where a second condition is satisfied, it is determined that the interference measurement resource includes one resource in one interference measurement resource set.

In the case where a second value is greater than 1, whether the reporting information includes index information of the interference measurement resources is determined according to second signaling information and/or a second predetermined rule.

In the case where a fourth condition is satisfied, it is determined that the interference measurement resource includes one resource in one interference measurement resource set.

In the case where a third condition is satisfied, it is determined that the interference measurement resource includes all resources in one interference measurement resource set.

The first value includes one of P, N or Q, and the second value includes one of D, N or Q.

The method includes at least one of characteristics described below.

The first condition includes at least one of the following: the first value is greater than 1; the reporting information does not include indexes of the interference measurement resource sets; or the repetition in the interference measurement resource set is configured to be on.

The second condition includes at least one of the following: the first value is greater than 1; the reporting information includes the indexes of the interference measurement resource sets; or the repetition in the interference measurement resource set is configured to be on.

The third condition includes at least one of the following: the second value is greater than 1; the reporting information does not include indexes of the interference measurement resources; or the repetition in the interference measurement resource set is configured to be off.

The fourth condition includes at least one of the following: the second value is greater than 1; the reporting information includes the indexes of the interference measurement resources; or the repetition in the interference measurement resource set is configured to be off.

The determined interference measurement resource is an interference measurement resource corresponding to one channel quality.

The first determination module is configured to implement an association between the resource configuration situation and the information type included in the reporting information along with a configuration manner of an interference resource in at least one of manners described below.

In response to a fifth condition being satisfied, the repetition in the interference measurement resource set is configured to be on. The fifth condition includes at least one of the following: P is greater than 1; N is greater than 1; Q is greater than 1; or the reporting information includes the indexes of the interference measurement resource sets.

In response to a sixth condition being satisfied, the repetition in the interference measurement resource set is configured to be off. The sixth condition includes at least one of the following: D is greater than 1; N is greater than 1; Q is greater than 1; or the reporting information includes the indexes of the interference measurement resources.

The first determination module is configured to implement an association between the resource configuration situation and the information type included in the reporting information in at least one of manners described below.

In the case where the repetition is configured to be on, the reporting information includes the indexes of the interference measurement resource sets.

In the case where the repetition is configured to be off, the reporting information includes indexes of the interference measurement resources in the interference measurement resource set.

In the case where N is greater than 1, the reporting information includes an index of the channel measurement resource in the channel measurement resource set.

In the case where N is equal to 1, the reporting information does not include an index of the channel measurement resource in the channel measurement resource set.

In the case where P or N or Q is greater than 1, the reporting information includes the index information of the interference measurement resource sets.

In the case where P or N or Q is equal to 1, the reporting information does not include the index information of the interference measurement resource sets.

In the case where D or N or Q is greater than 1, the reporting information includes index information of the interference measurement resources in the interference measurement resource set.

In the case where D or N or Q is equal to 1, the reporting information does not include index information of the interference measurement resource in the interference measurement resource set.

The information type included in the reporting information includes at least one of the following:

The reporting information includes index information of an interference measurement resource set of a predetermined type.

The reporting information includes index information of an interference measurement resource of a predetermined type in an interference measurement resource set of the predetermined type.

The interference measurement resource of the predetermined type includes at least one of a CSI-IM resource for interference measurement or an NZP-CSI-RS resource for interference measurement.

The information type included in the reporting information includes at least one of the following: one or more information combinations of a CSI-RS resource indicator (CRI) or single-sideband (SSB)Index, indexes of K31 first-type interference measurement resource sets, indexes of K32 second-type interference measurement resource sets, and a signal-to-interference-plus-noise ratio (SINR), where K31 and K32 belong to {0, 1}; one or more information combinations of a CRI or SSBIndex, reference signal received power (RSRP), indexes of K21 first-type interference measurement resource sets, indexes of K22 second-type interference measurement resource sets, and K2 SINRs, where K21 and K22 are non-negative integers and/or at least one of K21 or K22 is equal to K2, and K2 is a positive integer greater than or equal to 1; one or more information combinations of indexes of K41 first-type interference measurement resource sets, indexes of K42 second-type interference measurement resource sets, and an SINR, where K41 and K42 belong to {0, 1}; one or more information combinations of a CRI or SSB index, indexes of K51 first-type interference measurement resources, indexes of K52 second-type interference measurement resources, and an SINR, where K51 and K52 belong to {0, 1}; one or more information combinations of a CRI or SSB index, RSRP, indexes of K61 first-type interference measurement resources, indexes of K62 second-type interference measurement resources, and K6 SINRs, where K61 and K62 are non-negative integers, at least one of K61 or K62 is equal to K6, and K6 is a positive integer greater than or equal to 1; or one or more information combinations of indexes of K71 first-type interference measurement resources, indexes of K72 second-type interference measurement resources, and an SINR, where K71 and K72 belong to {0, 1} and K71+K72 is greater than 0.

The first-type interference measurement resource is the CSI-IM resource for interference measurement, and the second-type interference measurement resource is the NZP-CSI-RS resource for interference measurement.

The information type included in the reporting information includes at least one of the following: one or more information combinations of the CRI or SSBIndex, and the SINR; one or more information combinations of the CRI or SSBIndex, the RSRP, and one or more SINRs; one or more information combinations of the SINR; one or more information combinations of the CRI or SSBIndex, the indexes of the interference measurement resource sets, and the SINR; one or more information combinations of the CRI or SSBIndex, the RSRP, K2 interference measurement resource set indexes, and the K2 SINRs; one or more information combinations of the indexes of the interference measurement resource sets and the SINR; one or more information combinations of the CRI/SSBIndex, the indexes of the interference measurement resources, and the SINR; one or more information combinations of the CRI or SSBIndex, the RSRP, K2 interference measurement resource indexes, and the K2 SINRs, where K2; or one or more information combinations of the interference measurement resource sets and the SINR).

The first determination module is configured to implement the association between the first information and the second information in at least one of manners described below.

In the case where the information type included in the reporting information includes one or more information combinations of the CRI or SSBIndex, the indexes of the interference measurement resource sets, and the SINR, the one or more information combinations are selected from N*P SINRs; where P SINRs corresponding to one channel measurement resource correspond to P interference measurement resource sets, respectively and each SINR corresponds to one channel measurement resource and one resource in one interference measurement resource set.

In the case where the information type included in the reporting information includes one or more information combinations of the CRI or SSBIndex, the RSRP, the K2 interference measurement resource set indexes, and the K2 SINRs, one or more RSRP values are selected from N RSRP values; where each RSRP value corresponds to one channel measurement resource, different RSRP values correspond to different channel measurement resources, and the K2 interference measurement resource set indexes and the K2 SINRs in one information combination are selected from P SINRs; and each of the P SINRs is obtained according to a channel measurement resource corresponding to one RSPR value and one resource in one interference measurement resource set corresponding to the one RSPR value, and P SINRs corresponding to one channel measurement resource correspond to P interference measurement resource sets, respectively.

In the case where the information type included in the reporting information includes one or more information combinations of the indexes of the interference measurement resource sets and the SINR, the one or more information combinations are selected from N*P SINRs; where each SINR corresponds to one channel measurement resource and one resource in one interference measurement resource set, N is equal to 1, and P SINRs corresponding to one channel measurement resource correspond to P interference measurement resource sets, respectively.

In the case where the information type included in the reporting information includes one or more information combinations of the CRI or SSBIndex, the indexes of the interference measurement resources, and the SINR, the one or more information combinations are selected from N*D SINRs; where each SINR corresponds to one channel measurement resource and one resource in one interference measurement resource set, and D SINRs corresponding to one channel measurement resource correspond to D interference measurement resources in the same interference measurement resource set, respectively.

In the case where the information type included in the reporting information includes one or more information combinations of the CRI/or SSBIndex, the RSRP, the K2 interference measurement resource indexes, and the K2 SINRs, one or more RSRP values are selected from N RSRP values; where each RSRP value corresponds to one channel measurement resource, different RSRP values correspond to different channel measurement resources, and the K2 interference measurement resource indexes and the K2 SINRs in one information combination are selected from D SINRs; and each of D SINRs is obtained according to a channel measurement resource corresponding to one RSPR value and one resource in one interference measurement resource set corresponding to the one RSPR value, and D SINRs corresponding to one channel measurement resource correspond to D interference measurement resources in the same interference measurement resource set, respectively.

In the case where the information type included in the reporting information includes one or more information combinations of the indexes of the interference measurement resource sets and the SINR, the one or more information combinations are selected from N*P SINRs; where each SINR corresponds to one channel measurement resource and one resource in one interference measurement resource set, N is equal to 1, and D SINRs corresponding to one channel measurement resource correspond to D interference measurement resources in the same interference measurement resource set, respectively.

The method includes at least one of characteristics described below.

The indexes of the interference measurement resource sets are represented by using $\lceil \log_e P \rceil$ bits.

The indexes of the interference measurement resources are represented by using $\lceil \log_e D \rceil$ bits.

In the embodiment of the present disclosure, the interference measurement resource is the NZP-CSI-RS resource.

In the embodiment of the present disclosure, the resource or the first resource includes at least one of a reference signal resource, a synchronization signal resource or the interference measurement resource.

In an embodiment of the present disclosure, the determined interference measurement resource is an interference measurement resource corresponding to the one channel measurement resource; or the determined interference measurement resource is an interference measurement resource corresponding to one channel quality.

In an embodiment of the present disclosure, the method includes at least one of characteristics described below.

One piece of channel quality information is obtained according to one of the determined interference measurement resources; or one piece of channel quality information is obtained according to all of the determined interference measurement resources.

One channel quality is obtained according to one channel measurement resource and one or more interference measurement resources of interference measurement resources corresponding to the one channel measurement resource.

One channel measurement resource corresponds to one piece of channel quality information, or the number of pieces of channel quality information corresponding to one channel measurement resource is equal to the number of interference measurement resources corresponding to the one channel measurement resource.

The method satisfies one of characteristics described below.

In the case where one piece of channel quality information is obtained according to one of the determined interference measurement resources, one channel measurement resource corresponds to X pieces of channel quality information, where X is equal to the number of interference measurement resources included in the determined interference measurement resources.

In the case where one piece of channel quality information is obtained according to all of the determined interference measurement resources, one channel measurement resource corresponds to one piece of channel quality information.

The channel quality includes one of a channel quality indicator (CQI) or the signal-to-interference-plus-noise ratio (SINR).

According to the embodiment of the present disclosure, in the case where the number B of receive beams that can be provided by a receiving end at the same moment for one transmit beam is less than the number A of receive beams that belong to the receiving end and to which the one transmit beam needs to correspond, the first information is associated with the second information or the information type included in the reported information is associated with the manner for determining the interference measurement resource so that effective channel state measurement is achieved.

Another embodiment of the present disclosure provides an information determination apparatus. The apparatus includes a second determination module and a third determination module.

The second determination module is configured to determine P interference measurement resource sets corresponding to one channel measurement resource set, where the one channel measurement resource set includes N channel measurement resources, and P and N are positive integers greater than or equal to 1.

The third determination module is configured to determine an interference measurement resource according to the P interference measurement resource sets.

In an embodiment of the present disclosure, if it is determined according to signaling information or an agreed rule that one channel measurement setting corresponds to one interference measurement setting, one channel measurement set in the one channel measurement setting corresponds to P interference measurement sets in the one interference measurement setting.

In an embodiment of the present disclosure, in the case where P is 1, the third determination module is configured to perform one of operations described below.

It is determined that an interference measurement resource corresponding to each of the N channel measurement resources includes one or more resources in the one interference measurement resource set.

An interference measurement resource corresponding to each of the N channel measurement resources is determined according to a repeated sending parameter repetition in an interference measurement resource set.

The third determination module is configured to determine the interference measurement resource corresponding to each of the N channel measurement resources according to the repetition in the one interference measurement resource set in at least one of manners described below.

In the case where the repetition is configured to be on, it is determined that the interference measurement resource is one resource in the one interference measurement resource set.

In the case where the repetition is configured to be off, it is determined that the interference measurement resource is one or more resources in the one interference measurement resource set.

The number of channel qualities corresponding to an interference measurement resource corresponding to one channel quality and/or one of the N channel measurement resources is determined according to a repeated sending parameter repetition in an interference measurement resource set.

The third determination module is configured to determine the number of channel qualities corresponding to the interference measurement resource corresponding to the one channel quality and/or the one of the N channel measurement resources according to the repetition in the interference measurement resource set in at least one of manners described below.

In the case where the repetition is configured to be on, it is determined that the interference measurement resource corresponding to the one channel quality is one resource in the one interference measurement resource set.

In the case where the repetition is configured to be on, it is determined that the number of channel qualities corresponding to the one of the N channel measurement resources is 1, where the one channel quality is obtained according to one interference measurement resource with a correspondence to the one channel quality in the interference measurement resource set and the one of the N channel measurement resources.

In the case where the repetition is configured to be off, it is determined that the interference measurement resource corresponding to the one channel quality is one resource in the one interference measurement resource set.

In the case where the repetition is configured to be off, it is determined that the one of the N channel measurement resources corresponds to D pieces of channel quality information, where the D pieces of channel quality information correspond to D interference measurement resources in the one interference measurement resource set, respectively.

In the case where the repetition is configured to be off, it is determined that the interference measurement resource corresponding to the one channel quality is all resources in the one interference measurement resource set.

In the case where the repetition is configured to be off, it is determined that the one of the N channel measurement resources corresponds to one piece of channel quality information, where the one piece of channel quality information is obtained according to D interference measurement resources in the one interference measurement resource set and the one of the N channel measurement resources.

In an embodiment of the present disclosure, in the case where P is greater than 1, the third determination module is configured to determine the interference measurement resource according to the P interference measurement resource sets in one of manners described below.

It is determined that the interference measurement resource corresponding to each of the N channel measurement resources includes one or more resources in one of the P interference measurement resource sets, which has a correspondence to the each of the N channel measurement resources.

It is determined that the interference measurement resource corresponding to each of the N channel measurement resources in the one channel measurement resource set includes one or more second resources, where one of the second resources includes one resource with a correspondence to the each of the N channel measurement resources in one of the P interference measurement resource sets.

It is determined that the interference measurement resource corresponding to each of the N channel measurement resources includes one or more resources in one of the P interference measurement resource sets, which satisfies a quasi co-location relationship with the each of the N channel measurement resources with respect to a spatial receive parameter.

It is determined that the interference measurement resource corresponding to each of the N channel measurement resources in the one channel measurement resource set includes one resource satisfying a quasi co-location relationship with the each of the N channel measurement resources with respect to a spatial receive parameter in one or more of the P interference measurement resource sets.

The third determination module is configured to determine the interference measurement resource according to the P interference measurement resource sets in at least one of manners described below.

In the case where the number of interference measurement resources corresponding to one of the N channel measurement resources is greater than 1, the interference measurement resource corresponding to one channel quality and/or interference measurement resources corresponding to the one of the N channel measurement resources are determined according to the signaling information and/or the agreed rule.

In the case where multiple interference measurement resources are from different interference measurement sets, whether the interference measurement resource corresponding to the one channel quality is one of the multiple interference measurement resources or all the multiple interference measurement resources is determined according to the signaling information and/or the agreed rule.

In the case where multiple interference measurement resources are from the same interference measurement set, whether the interference measurement resource corresponding to the one channel quality is one of the multiple interference measurement resources or all the multiple interference measurement resources is determined according to the signaling information and/or the agreed rule.

P or the number D of resources included in the one interference measurement resource set satisfies one of characteristics described below.

P or D is greater than or equal to N.

P or D is greater than or equal to the number Q of different pieces of spatial receive information in the N channel measurement resources, where Q is a positive integer greater than or equal to 1.

P or D is greater than or equal to the number of channel measurement resource groups included in the channel measurement set.

P or D is greater than or equal to the number of resources included in a channel measurement resource group, where the channel measurement set includes one or more channel measurement resource groups.

In the case where P is greater than 1, the third determination module is configured to determine the interference measurement resource according to the P interference measurement resource sets in one of manners described below.

It is determined that the interference measurement resource corresponding to each of the N channel measurement resources includes one or more resources in one of the P interference measurement resource sets, which has the correspondence to the each of the N channel measurement resources.

It is determined that the interference measurement resource corresponding to each of the N channel measurement resources in the one channel measurement resource set includes one or more second resources, where one of the second resources includes one resource with the correspondence to the each of the N channel measurement resources in one of the P interference measurement resource sets, and different second resources correspond to different interference measurement resource sets.

It is determined that the interference measurement resource corresponding to each of the N channel measurement resources includes one or more resources in one of the P interference measurement resource sets, which satisfies the quasi co-location relationship with the each of the N channel measurement resources with respect to the spatial receive parameter.

It is determined that the interference measurement resource corresponding to each of the N channel measurement resources in the one channel measurement resource set includes one or more third resources, where one of the third resources includes one resource satisfying the quasi co-location relationship with the each of the N channel measurement resources with respect to the spatial receive parameter in one of the P interference measurement resource sets, and different third resources correspond to different interference measurement resource sets.

The method includes at least one of characteristics described below.

The one of the P interference measurement resource sets, which has the correspondence to the each of the N channel measurement resources, is determined according to first signaling information and/or a first predetermined rule.

One resource with the correspondence to the each of the N channel measurement resources in each of the P interference measurement resource sets is determined according to second signaling information and/or a second predetermined rule.

In an embodiment of the present disclosure, the third determination module is configured to determine the interference measurement resource according to the P interference measurement resource sets in at least one of manners described below.

In the case where the number of interference measurement resources corresponding to one of the N channel measurement resources is greater than 1, the interference measurement resource corresponding to one channel quality and/or the number of channel qualities corresponding to the one of the N channel measurement resources are determined according to the signaling information and/or the agreed rule.

Whether the interference measurement resource corresponding to the one channel quality is one of the multiple interference measurement resources or all the multiple interference measurement resources is determined according to the signaling information and/or the agreed rule.

Whether the number of channel qualities corresponding to the one of the N channel measurement resources is equal to 1 or the number of the multiple interference measurement resources is determined according to the signaling information and/or the agreed rule.

A manner for acquiring a predetermined rule includes at least one of the following information: the number N of the channel measurement resources included in the one channel measurement resource set; the number Q of different pieces of spatial receive information in the one channel measurement resource set; the number P of the interference measurement resource sets; the number D of resources included in each of the P interference measurement resource sets; or a configuration situation of a repeated sending parameter repetition in each of the P interference measurement resource sets.

The configuration situation of the repetition includes configuring no repetition, configuring the repetition, configuring the repetition to be on or configuring the repetition to be off.

In an embodiment of the present disclosure, the third determination module is configured to perform an operation described below.

It is determined that the interference measurement resource corresponding to each of the N channel measurement resources includes P measurement reference signal resources, where different measurement reference signal resources of the P measurement reference signal resources are from different interference measurement resource sets of the P interference measurement resource sets.

In an embodiment of the present disclosure, the P interference measurement resource sets satisfy at least one of characteristics described below.

The repeated sending parameter repetition is configured in each of the P interference measurement resource sets.

A set composed of interference measurement resources configured with quasi co-location reference signals with respect to the spatial receive parameter in each of the P interference measurement resource sets is an empty set.

Different interference measurement resource sets of the P interference measurement resource sets include the same number of resources.

The P interference measurement resource sets have the same time domain characteristic, where the time domain characteristic includes being periodic, being aperiodic or being semi-persistent.

The number of resources included in each of the P interference measurement resource sets is greater than or equal to N.

The number of resources included in each of the P interference measurement resource sets is greater than or equal to the number Q of different spatial receive parameters in the N channel measurement resources, where Q is a positive integer greater than or equal to 1.

The P interference measurement resource sets belong to one interference measurement resource setting corresponding to the one channel measurement resource set.

The P interference measurement resource sets are of the same type. A type of a first interference measurement resource set includes any one or more of a CSI-IM resource set for interference measurement or an NZP-CSI-RS resource set for interference measurement. A type of one interference measurement resource set includes any one of the following: the number of channel measurement resources corresponding to the one interference measurement resource set in the one channel measurement resource set is greater than a predetermined value, or the number of channel measurement resources corresponding to the one interference measurement resource set in the one channel measurement resource set is less than or equal to a predetermined value.

The P interference measurement resource sets are associated with the spatial receive information, where the spatial receive information includes at least one of the spatial receive parameter or the quasi co-location reference signal with respect to the spatial receive parameter.

The method includes at least one of characteristics described below.

The repeated sending parameter repetition in each of the P interference measurement resource sets is configured to be on.

The repeated sending parameter repetition in each of the P interference measurement resource sets is configured to be off.

A manner for determining an interference resource is associated with the repeated sending parameter repetition in each of the P interference measurement resource sets.

The one interference measurement resource setting includes at least one of a CSI-IM resource setting for interference measurement or an NZP-CSI-RS resource setting for interference measurement.

P or the number D of resources included in each of the P interference measurement resource sets is determined according to at least one of the following information: the number of resources included in the one channel measurement resource set; the number of different pieces of spatial receive information in the one channel measurement resource set; the number of channel measurement resource groups; the number of resources included in the channel measurement resource group; whether a configured transmission configuration indication (TCI) includes at least one TCI state of a quasi co-location reference signal associated with the spatial receive parameter; or information about the number of pieces of spatial receive information reported by a communication node, where the communication node is a node that receives the interference measurement resource.

The number of spatial receive parameters reported by the communication node may also be referred to as the number of receive beams used for receiving an NZP-CSI-RS and reported by the communication node and/or the number of repeated sending resources that the communication node requests an NZP-CSI-RS set to include.

The one channel measurement resource set includes one or more channel measurement resource groups.

The method satisfies at least one of characteristics described below.

In the case where the one channel measurement resource set corresponds to the one interference measurement resource set, any two resources in the one channel measurement resource set satisfy the quasi co-location relationship with respect to the spatial receive parameter.

In the case where any two resources in the one channel measurement resource set satisfy the quasi co-location relationship with respect to the spatial receive parameter, the one channel measurement resource set corresponds to the one interference measurement resource set.

An intersection between the one channel measurement resource set and each of the P interference measurement resource sets is non-empty.

One measurement reference signal resource has the same spatial receive information as a channel measurement resource and as an interference measurement resource.

Spatial receive information of one measurement reference signal resource as a channel measurement resource and spatial receive information of the one measurement reference signal resource as an interference measurement resource are associated with one piece of group information. A group associated with a resource includes at least one of a resource group to which the resource belongs, a control channel resource group to which a control channel for scheduling the resource belongs, a reference signal group where a quasi co-location reference signal of the resource is located or an antenna group of the communication node corresponding to the resource. The group information includes a group index.

One channel quality is obtained according to one of the N channel measurement resources and one or more interference measurement resources of interference measurement resources corresponding to the one of the N channel measurement resources.

One of the N channel measurement resources corresponds to one piece of channel quality information, or the number of pieces of channel quality information corresponding to one of the N channel measurement resources is equal to the number of interference measurement resources corresponding to the one of the N channel measurement resources.

According to the embodiment of the present disclosure, in the case where the number B of receive beams that can be provided by a receiving end at the same moment for one transmit beam is less than the number A of receive beams that belong to the receiving end and to which the one transmit beam needs to correspond, the interference measurement resource is determined based on the P interference measurement resource sets so that effective channel state measurement is achieved.

Another embodiment of the present disclosure provides an information determination apparatus. The information determination apparatus includes a processor and a computer-readable storage medium, where the computer-readable storage medium stores an instruction which, when executed by the processor, implements any one of the information determination methods described above.

Another embodiment of the present disclosure provides a computer-readable storage medium. The computer-readable storage medium stores a computer program which, when executed by a processor, implements steps of any one of the information determination methods described above.

The preceding method for determining the interference measurement resource is described below in detail through embodiments. The embodiments described hereinafter are not intended to limit the scope of embodiments of the present disclosure.

Embodiment One

In this embodiment, one channel measurement resource (CMR) set includes more than one measurement reference signal resource. When one resource in the CMR set is used as a channel measurement resource, an interference measurement resource includes a difference between resources in a second predetermined set (that is, a second-type set) and the channel measurement resource. The second predetermined set may be the CMR set.

In an embodiment, the resources in the second predetermined set include NZP-CSI-RS resources.

In an embodiment, all resources in the CMR set correspond to the same second predetermined set.

In an embodiment, for example, a base station configures a configuration shown in Table 1 for a terminal, where set1={CRI0, CRI1, CRI2, CRI3} is configured in a resource setting for channel measurement (CM), and set2={IMR0, IMR1, IMR2, IMR3} is configured in a resource setting for interference measurement (IM). When CRI0 is used as the channel measurement resource, the interference measurement resource includes {CRI1, CRI2, CRI3}. For example, interference measurement resources are {CRI1, CRI2, CRI3} (that is, NZP-CSI-RS resources for interference measurement) and {IMR0} (that is, a CSI-IM resource for interference measurement). Resources in a resource set for CM are in a one-to-one correspondence to resources in a resource set for interference measurement resource (IMR). Resources of IMRs are CSI-IM resources.

TABLE 1

| Resource Setting | Resource Set |
| --- | --- |
| Resource setting1 for CM | {CRI0,CRI1,CRI2,CRI3} |
| Resource setting2 for IM | {IMR0,IMR1,IMR2,IMR3} |

The preceding scheme may also be implemented in a configuration manner in Table 2. When one resource of CMRs is used as the channel measurement resource, the interference measurement resource includes the difference between the resources in the second predetermined set and the channel measurement resource. In Table 2, the difference between the second predetermined set and the CMR set is non-empty. Of course, it is not excluded in this embodiment that the second predetermined set is the CMR set, as shown in Table 1.

TABLE 2

| Resource Setting | Resource Set |
| --- | --- |
| Resource setting1 for CM | {CRI0,CRI1,CRI2,CRI3} |
| Second predetermined set | {CRI0,CRI1,CRI2,CRI3,CRI4} |
| Resource setting2 for IM | {IMR0,IMR1,IMR2,IMR3} |

In Table 2, the interference measurement resource includes two parts: one part is the difference between the resources in the second predetermined set and the channel measurement resource, and the other part includes an IMR corresponding to the channel measurement resource in resource setting2 for IM. Interference measurement resources included in resource setting2 for IM are CSI-IM resources. The CSI-IM resources in resource setting2 for IM are in the one-to-one correspondence to resources in resource setting1 for CM. This part of interference measurement resources may also be referred to as CSI-IM resources for interference measurement. Of course, it is not excluded in this embodiment that the interference measurement resource includes only the difference between the resources in the second predetermined set and the channel measurement resource.

In an embodiment, as shown in FIG. 3, {CRI0, CRI1, CRI2, CRI3} correspond to four transmit beams {0, 1, 2, 3} respectively at the base station. In the case where the base station intends to simultaneously provide these beams, the base station expects to measure which beam is used for user equipment (UE) 1 to send a physical downlink shared channel (PDSCH). For example, the four beams are used for multi-user (MU) scheduling among different UEs. An optimal receive beam of beam i is receive beam i, where i=0, 1, 2, 3. When transmit beam 0 is used as a channel measurement beam, an interference measurement beam includes transmit beams {1, 2, 3}. Receive beams for interference measurement beams {1, 2,} should be receive beam 0, that is, the terminal needs to obtain a channel measurement result in the case where the channel measurement beam and the interference measurement beam are received using receive beam 0, such as a signal-to-interference-plus-noise ratio (SINR), a reference signal receive quality (RSRQ) or a channel quality indicator (CQI). When transmit beam 1 is used as the channel measurement beam, the interference measurement beam includes transmit beams {0, 2, 3}. In this case, the receive beam should be receive beam 1, the optimal receive beam corresponding to the channel measurement beam. In this manner, one transmit beam needs to correspond to four receive beams which correspond to the receive beam when the one transmit beam is used as the channel measurement beam and receive beams when the one transmit beam is used as the interference measurement beam, respectively. If the terminal can simultaneously provide four receive beams at one moment, one measurement reference signal resource can correspond to four receive beams at the one moment and the preceding scheme may be adopted, that is, one transmit beam can correspond to one reference signal resource, and when one reference signal resource is used for channel measurement, the interference measurement resource includes the difference between the resources in the second predetermined set and the channel measurement resource. However, if the terminal can only provide a limited number of receive beams such as one receive beam at one moment, one measurement resource can correspond to only one receive beam at the one moment. Therefore, the interference measurement resource is determined by using at least one of schemes described below.

Scheme one: All the resources in the CMR set satisfy a quasi co-location relationship with respect to a spatial receive parameter so that when one resource in the CMR set is used for channel measurement, the interference measurement resource includes a difference between the CMR set and the channel measurement resource.

Scheme two: When one resource in the CMR set is used as the channel measurement resource, the interference measurement resource includes a difference between resources in a set (that is, a first-type set) composed of resources satisfying the quasi co-location relationship with the channel measurement resource with respect to the spatial receive parameter in the second predetermined set and the channel measurement resource. A configuration of quasi co-location reference signals of reference signal resources {CRI0, CRI1, CRI2, CRI3} in Table 2 with respect to the spatial receive parameter is shown in Table 3. When CRI0 in Table 2 is used as the channel measurement resource, reference signals satisfying the quasi co-location relationship with CRI0 with respect to the spatial receive parameter in the second-type set include {CRI0, CRI2, CRI3}. In this case, the interference measurement resource includes a difference between {CRI0, CRI2, CRI3} and {CRI0}, that is, {CRI2, CRI3}.

Scheme three: A predetermined setting (that is, a second-type setting) includes multiple sets and a repeated sending parameter (repetition) configured in each set is on. That is, all measurement reference signal resources in the set have the same spatial transmit filter, for example, have the same transmit beam. In an embodiment, the number of resources included in each set is associated with the number of resources included in the CMRs, or the number of resources included in each set is associated with the number of resources having different spatial receive parameters and included in the CMRs.

The number of resources included in each set in the predetermined setting (an interference measurement resource setting or an NZP-CSI-RS resource setting) and with a correspondence to a resource of the CMRs is equal to the number of resources included in the CMRs minus 1, and the number of resources included in each set in the predetermined setting and with no correspondence to a resource of the CMRs is equal to the number of resources included in the CMRs. A configuration shown in Table 4 may be adopted. The resource setting for CM includes one set, the predetermined setting includes five sets, and one measurement reference signal resource CRIi in the CMR set corresponds to one set seti in the predetermined setting, where i=0, 1, 2, 3. When one measurement reference signal resource in the CMR set is used as the channel measurement resource, the interference measurement resource includes one resource in each set (that is, the second-type set) except the set corresponding to the channel measurement resource (that is, the first-type set) in the predetermined setting. For example, when CRI0 of the CMRs is used as the channel measurement resource, the interference measurement resource includes one resource in each of {set1, set2, set3, set4} except set0 in the predetermined setting.

In an embodiment, resources in setj in the predetermined setting are in the one-to-one correspondence to resources except resource i of the CMRs in sequence, where i is not equal to j. For example, {CRI0, CRI01, CRI02} in set0 in the predetermined setting are in the one-to-one correspondence to CRIs {CRI1, CRI2, CRI3} except CRI0 of the CMRs in sequence. {CRI1, CRI11, CRI12} in set1 in the predetermined setting are in the one-to-one correspondence to {CRI0, CRI2, CRI3} except CRI1 of the CMRs in sequence. Therefore, when CRI0 of the CMRs is used for channel measurement, resource 0 in each of {set1, set2, set3, set4} (third-type sets) except set0 (that is, a fifth-type set) in the second-type setting is used, that is, the interference measurement resource includes {CRI1, CRI2, CRI3, CRI4}. Similarly, when CRI1 of the CMRs is used as the channel measurement resource, the interference measurement resource includes {CRI0, CRI21, CRI31, CRI41}, which are resources {0, 1, 1, 1} in {set0, set2, set3, set4}, respectively. In an embodiment, the channel measurement resource and the interference measurement resource satisfy the quasi co-location relationship with respect to a spatial receive filtering parameter.

TABLE 3

| Target Reference Signal | Quasi Co-Location Reference Signal with respect to the Spatial Receive Parameter |
|---|---|
| CRI0 | CRI4 |
| CRI1 | SSB1 |
| CRI2 | CRI5 |
| CRI3 | CRI4 |

TABLE 4

| Resource Setting | Resource Set |
|---|---|
| Resource setting1 for CM | {CRI0,CRI1,CRI2,CRI3} |
| Predetermined setting | set0={CRI0,CRI01,CRI02}, |
| | set1={CRI1,CRI11,CRI12}, |
| | set2={CRI2,CRI21,CRI22}, |
| | set3={CRI3, CRI31,CRI32}, |
| | set4={CRI4,CRI41,CRI42,CRI43} |

Alternatively, the number of resources included in each set in the predetermined setting (or the interference measurement resource setting) is equal to the number of resources included in the CMRs, and resources in each set in the predetermined setting (or the interference measurement resource setting) are in the one-to-one correspondence to the resources of the CMRs in sequence. When one resource of the CMRs is used as the channel measurement resource, the interference measurement resource includes one resource in each set (that is, a second set) except the set corresponding to the channel measurement resource (that is, a first set) in the predetermined setting. As shown in Table 5, CRIi corresponds to seti in the predetermined setting. When CRIi in the CMR set is used for channel measurement, resource i in each set except seti in the predetermined setting is used as the interference measurement resource.

TABLE 5

| Resource Setting | Resource Set |
|---|---|
| Resource setting1 for CM | {CRI0,CRI1,CRI2,CRI3} |
| Predetermined setting | set0={CRI0,CRI0,CRI01,CRI02}, |
| | set1={CRI1,CRI1,CRI11,CRI12}, |
| | set2={CRI2,CRI21,CRI2,CRI22}, |
| | set3={CRI3,CRI31,CRI32,CRI3}, |
| | set4={CRI4,CRI41,CRI42,CRI43} |

Scheme four: Each resource of the CMRs corresponds to one set in a predetermined setting (or an interference measurement resource setting, that is, a first-type setting) as its interference measurement resource set. As shown by a configuration in Table 6, when one resource CRIi of the CMRs is used as the channel measurement resource, resources in one set seti in the predetermined setting (or the interference measurement resource setting) and with a correspondence to CRIi are used as interference measurement resources.

TABLE 6

| Resource Setting | Resource Set |
|---|---|
| Resource setting1 for CMR | {CRI0,CRI1,CRI2,CRI3} |
| Predetermined setting | set0={CRI1,CRI2,CRI3,CRI4}, |
| | set1={CRI0,CRI21,CRI31,CRI41} |
| | set2={CRI01,CRI11,CRI32,CRI42}, |
| | set3={CRI02,CRI12,CRI22,CRI43} |

Similarly, the number of resources included in a set in the predetermined setting (the interference measurement resource setting or the NZP-CSI-RS resource setting, that is, the second-type setting) is equal to the number of different spatial receive parameters included in the CMRs, or the number of resources included in a set in the predetermined setting (the interference measurement resource setting, that is, the second-type setting) is equal to the number of different spatial receive parameters included in the CMRs minus 1. For example, a configuration of quasi co-location reference signals of CRIs in Table 2 with respect to the spatial receive filtering parameter is shown in Table 3. The number of resources with different spatial receive parameters and of the CMRs is 3. It is believed that resources that do not satisfy the quasi co-location relationship with respect to the spatial receive parameter have different spatial receive parameters.

In the preceding schemes, multiple NZP-CSI-RS resources in each set in the predetermined setting (or the interference measurement resource setting) have the same spatial transmit filtering parameter. It is not excluded in this embodiment that multiple NZP-CSI-RS resources in the set are associated with other parameters. For example, multiple NZP-CSI-RSs have the same power parameter.

In the preceding embodiments, an example in which CRIs in the setting for CM and the predetermined setting (or referred to as the interference measurement resource setting) are NZP-CSI-RS resources is used. It is excluded in this embodiment that the preceding set includes SSBs and/or NZP-CSI-RS resources. The predetermined setting (or referred to as the interference measurement resource setting) may also include CSI-IM resources.

In an embodiment, the predetermined setting (or referred to as the interference measurement resource setting) is an NZP-CSI-RS setting for interference measure, and/or the predetermined setting (or referred to as the interference measurement resource setting) is an NZP-IMR setting for interference measure.

In the preceding schemes, one channel measurement resource corresponds to one SINR. It is not excluded in this embodiment that the one channel measurement resource corresponds to multiple SINR/CQI/RSRQs (that is, channel qualities). Each channel quality corresponds to one of multiple interference measurement resources corresponding to the one channel quality. The terminal selects an SINR from multiple SINRs and reports an index of an interference measurement beam corresponding to the SINR or an index of an interference measurement resource corresponding to the SINR to the base station.

Embodiment Two

In this embodiment, one CMR set includes more than one measurement reference signal resource, the one CMR set corresponds to one NZP-CSI-RS resource set for interference measurement (IM), and the more than one measurement reference signal resource of the CMRs share a resource in the NZP-CSI-RS resource set for IM. As shown in Table 7, when CRIi of the CMRs is used as a channel measurement resource, an interference measurement resource includes one set {CRI4, CRI5, CRI6} in NZP-CSI-RS resource setting2 for IM. As shown in FIG. 4, {CRI4, CRI5, CRI6} correspond to transmit beams of transmission reception point (TRP) 2, and TRP1 serves UE1, where TRP1 and TRP2 occupy the same time-frequency resources.

TABLE 7

| Resource Setting | Resource Set |
| --- | --- |
| Resource setting1 for CM | {CRI0,CRI1,CRI2,CRI3} |
| NZP-CSI-RS resource setting2 for IM | {CRI4,CRI5,CRI6} |

In FIG. 4, a terminal receives resources of the CMRs by using one receive beam, for example, the terminal is omni-directional.

Figure 5:
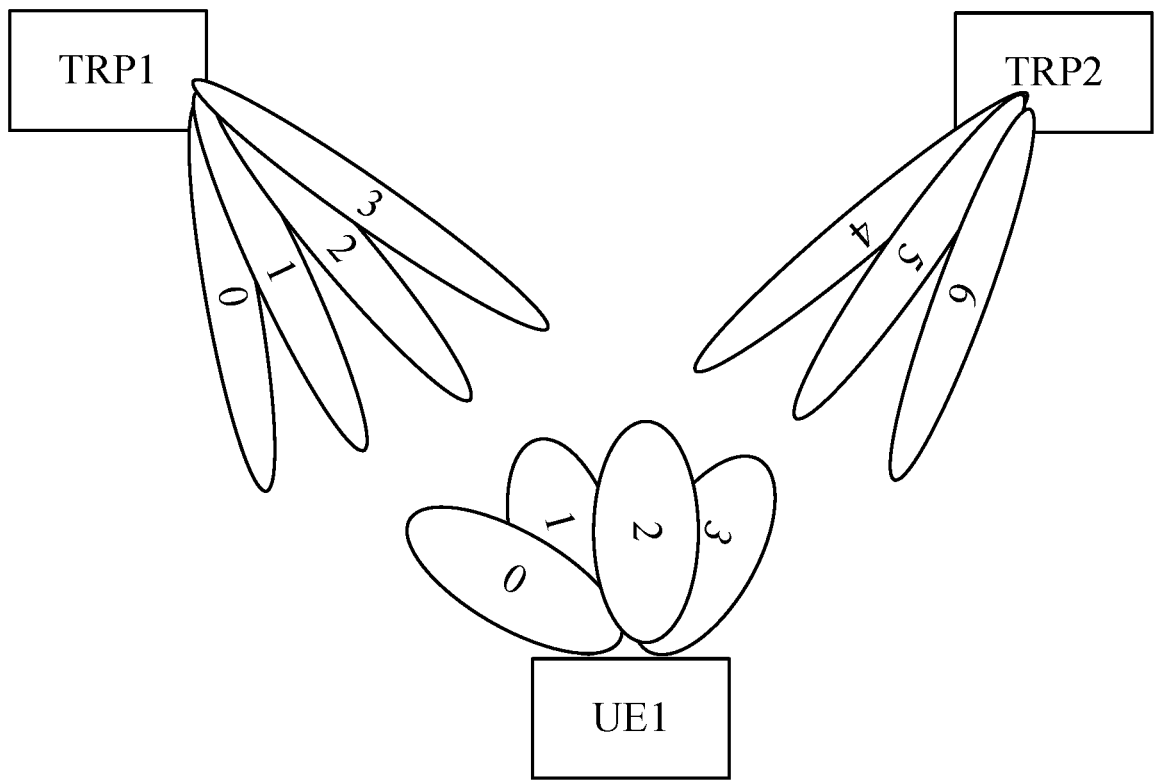
FIG. 5 is a schematic diagram illustrating that channel measurement beams and interference measurement beams are from different TRPs and different channel measurement beams have different optimal receive beams according to an embodiment of the present disclosure.

In FIG. 5, different resources of the CMRs have different spatial receive parameters. Therefore, each resource in NZP-CSI-RS resource setting2 for IMR in Table 7 should correspond to one set. When one resource of the CMRs is used as the channel measurement resource, the one set in NZP-CSI-RS resource setting2 (that is, a first-type setting) for IMR is used as the interference measurement resource. As shown by a configuration in Table 8, when one resource in the CMR set is used as the channel measurement resource, one set (that is, one fourth-type set) in NZP-CSI-RS resource setting2 for IMR is used as NZP-CSI-RS resources for interference measurement.

TABLE 8

| Resource Setting | Resource Set |
| --- | --- |
| Resource setting1 for CMR | {CRI0,CRI1,CRI2,CRI3} |
| NZP-CSI-RS resource setting2 for IMR | set0={CRI40,CRI50,CRI60} |
| | set1={CRI41,CR151,CR161} |
| | set2={CR142,CR152,CRI62} |
| | set3={CR143,CR153,CRI63} |

Alternatively, as shown in Table 9, when one resource of the CMRs is used as the channel measurement resource, an interference measurement resource set includes one resource in each set (that is, each third-type set) in NZP-CSI-RS resource setting2 for IMR (that is, a predetermined setting or a second-type setting). For example, when CRI0 is used as the channel measurement resource, CRI40 in set0, CRI50 in set1 and CRI60 in set2 are included in the interference measurement resource. When CRI1 is used for channel measurement, CRI41 in set0, CRI51 in set1 and CRI61 in set2 are included in the interference measurement resource. In an embodiment, a repetition in each set in NZP-CSI-RS resource setting2 for IMR is configured to be "on", which indicates that one set corresponds to the same transmit beam. Sets in NZP-CSI-RS resource setting2 for IMR satisfy at least one of the following conditions: multiple IMR sets include the same number of resources, the number A of resources included in each IMR set is related to the number B of resources included in the CMR set (for example, A=B or A is an integer multiple of B), the number A of resources included in each IMR set is related to the number Q of resources with different spatial receive filtering parameters and in the CMR set (for example, A=Q or A is an integer multiple of Q), or each resource in the CMR set corresponds to its respective one interference measurement resource in each IMR set.

TABLE 9

| Resource Setting | Resource Set |
| --- | --- |
| Resource setting1 for CMR NZP-CSI-RS resource setting2 for IMR | {CRI0,CRI1,CR12,CRI3} set0={CRI40,CRI41,CRI42, CRI 43}; Set1={CRI50,CRI51,CRI52, CRI 53}; Set2={CRI60,CRI61,CRI62, CRI 63} |

Alternatively, as shown in Table 10, the number of sets included in NZP-CSI-RS resource setting2 for IMR is equal to the number of different spatial receive parameters included in the CMR set. For example, the number of different spatial receive parameters included in the CMR set {CRI0, CRI1, CRI2, CRI3} is 2, the number of sets included in NZP-CSI-RS resource setting2 for IMR is greater than or equal to the number of different spatial receive filtering parameters included in the CMR set. When one resource in the CMR set is used as the channel measurement resource, the interference measurement resource includes a resource in a set satisfying a quasi co-location relationship with the channel measurement resource with respect to the spatial receive filtering parameter in NZP-CSI-RS resource setting2 for IMR. For example, {CRI0, CRI1} of the CMRs satisfy the quasi co-location relationship with respect to the spatial receive filtering parameter, {CRI2, CRI3} of the CMRs satisfy the quasi co-location relationship with respect to the spatial receive filtering parameter, {CRI0, CRI1} and {CRI2, CRI3} do not satisfy the quasi co-location relationship with respect to the spatial receive filtering parameter, interference measurement resources in set0 and {CRI0, CRI1} satisfy the quasi co-location relationship with respect to the spatial receive filtering parameter, and interference measurement resources in set1 and {CRI2, CRI3} satisfy the quasi co-location relationship with respect to the spatial receive filtering parameter. When one resource in {CRI0, CRI1} is used as the channel measurement resource, the interference measurement resources are interference measurement resource set0 and when one resource in {CRI2, CRI3} is used as the channel measurement resource, the interference measurement resources are interference measurement resource set1.

Similarly, the number of sets included in the first-type setting is greater than or equal to the number of groups included in the CMR set; or the number of sets included in the first-type setting is greater than or equal to the number of resources included in a group in the CMR set, where channel measurement resources in the same group can be simultaneously received and channel measurement resources in different groups cannot be simultaneously received; or the number of sets included in the first-type setting is greater than or equal to the maximum number of resources included in a group in the CMR set, where channel measurement resources in different groups can be simultaneously received and channel measurement resources in the same group cannot be simultaneously received.

TABLE 10

| Resource Setting | Resource Set |
| --- | --- |
| Resource setting1 for CMR | {CRI0,CRI1,CRI2,CRI3} |
| NZP-CSI-RS resource setting2 for IMR | set0={CRI40,CRI50,CRI60}; set1={CRI41,CRI51,CRI61} |

Alternatively, as shown in Table 11, NZP-CSI-RS resource setting2 for IMR includes three sets, the number of resources included in each set is greater than or equal to the number of different spatial receive parameters included in the CMRs, the repeated sending parameter repetition in each set is configured to be on, and when one resource of the CMRs is used for channel measurement, one resource in each set in NZP-CSI-RS resource setting2 for IM is used. In an embodiment, each set in NZP-CSI-RS resource setting2 for IM corresponds to different spatial receive parameters in the CMRs in sequence. For example, in Table 11, {CRI40, CRI41} in set0 correspond to {{CM, CRI1}, {CRI2, CRI3}} in sequence, where {CRI0, CRI1} (that is, a fourth set) is associated with one spatial receive parameter, {CRI2, CRI3} is associated with another spatial receive parameter, and {CRI0, CRI1} and {CRI2, CRI3} are different fourth sets.

Similarly, the number of resources included in each set is greater than or equal to the number of groups included in the CMR set; or the number of resources included in each set is greater than or equal to the number of resources included in a group in the CMR set, where channel measurement resources in the same group can be simultaneously received and channel measurement resources in different groups cannot be simultaneously received; or the number of resources included in each set is greater than or equal to the maximum number of resources included in a group in the CMR set, where channel measurement resources in different groups can be simultaneously received and channel measurement resources in the same group cannot be simultaneously received.

TABLE 11

| Resource Setting | Resource Set |
| --- | --- |
| Resource setting1 for CM | {CRI0,CRI1,CRI2,CRI3} |
| NZP-CSI-RS resource setting2 for IM | set0={CR140,CRI41}; Set1={CRI50,CRI51}; Set2={CRI60,CR161} |

In an embodiment, whether the configuration in Table 7 or the configuration in one of Tables 8 to 11 is used may be determined according to a reported ability of the terminal. The configuration in Table 7 may be used when the maximum number of receive beams maxNumberRxBeam in the reported ability of the terminal is 1, that is, the receive beams of the terminal are omnidirectional.

The configuration in one of Tables 8 to 11 needs to be used when the maximum number of receive beams maxNumberRxBeam in the reported ability of the terminal is not 1, that is, the receive beams of the terminal are not omnidirectional. maxNumberRxBeam represents the number of resources that the terminal requests to be repeatedly sent for one NZP-CSI-RS set.

Similarly, whether the configuration in Table 7 can be used may be determined through a relationship between a carrier frequency where a measurement reference signal is located and a predetermined threshold. The configuration in Table 7 may be used in the case of frequency range 1 (FR1), and the configuration in one of Tables 8 to 11 needs to be used in the case of FR2.

Similarly, it may be determined through a configuration of a base station. The configuration in Table 7 may be used when none of transmission configuration indication (TCI) states from the base station to the terminal includes a quasi co-location reference signal associated with the spatial receive parameter, that is, the terminal is in a low-frequency state or in an omnidirectional communication state at this time. The configuration in one of Tables 8 to 11 needs to be used when at least one of the TCI states from the base station to the terminal includes the quasi co-location reference signal associated with the spatial receive parameter, that is, the terminal is in a high-frequency state or in a beam communication state at this time.

Figure 6:
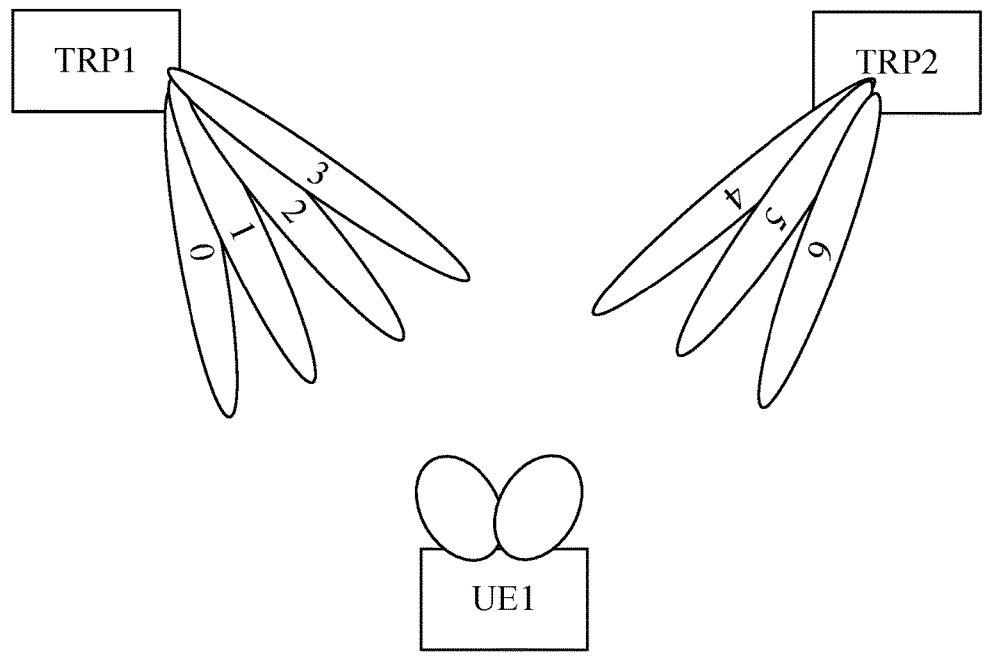
FIG. 6 is a schematic diagram illustrating that channel measurement beams and interference measurement beams are from different TRPs and different channel measurement beams have the same optimal receive beam or different optimal receive beams according to an embodiment of the present disclosure.

Similarly, whether Table 7 or one of Tables 8 to 11 is used may be determined through the number of groups included in the channel measurement resource set. For example, the terminal can simultaneously receive channel measurement resources in the same group and cannot simultaneously receive channel measurement resources in different groups so that when the number of groups included in the channel measurement resource set is 1, Table 7 is used or otherwise, one of Tables 8 to 11 is used. Alternatively, for example, the terminal can simultaneously receive channel measurement resources in different groups and cannot simultaneously receive channel measurement resources in the same group so that when the number of resources included in the group is 1, Table 7 is used or otherwise, one of Tables 8 to 11 is used. As shown in FIGS. 5 and 6, though channel measurement beams correspond to different optimal receive beams, the terminal can simultaneously provide these optimal receive beams at one moment. For example, when four channel measurement resources corresponding to the channel measurement beams belong to the same resource group, the method shown in Table 7 may be used. Otherwise, the configuration in one of Tables 8 to 11 needs to be used. Alternatively, when the four channel measurement resources corresponding to the channel measurement beams belong to different resource groups (the terminal can simultaneously receive resources in different resource groups) and each group includes at most one resource, the method shown in Table 7 may be used. Otherwise, the configuration in one of Tables 8 to 11 needs to be used.

In an embodiment, two types of NZP-CSI-RS resource may be defined. One type of NZP-CSI-RS resource is as shown in Table 7 or 9 to 11: one NZP-CSI-RS resource set for interference measurement is shared by multiple resources in the CMR set. The other type of NZP-CSI-RS resource is as shown in Table 8: one NZP-CSI-RS resource set for interference measurement is exclusive to one resource in the CMR set and cannot be shared by more than one resource in the CMR set.

In an embodiment, even if the CMR set includes multiple different spatial receive parameters, the terminal can simultaneously provide beams corresponding to the multiple receive parameters so that one interference measurement resource can simultaneously correspond to multiple receive beams at one moment. Therefore, the number of sets included in an interference measurement resource setting or the number of resources included in an interference measurement resource set may be less than the number of different receive parameters in the CMR set. For example, if the terminal can simultaneously provide receive beams corresponding to measurement reference signals in one group and cannot simultaneously provide receive beams corresponding to different measurement reference signals in different groups, the number of resources included in the interference measurement resource set is greater than or equal to the number of groups included in the CMR set in Table 8.

In the preceding embodiments, an example in which CRTs in both the setting for CM and NZP-CSI-RS resource setting2 for IM are NZP-CSI-RS resources is used. However, it is not excluded in this embodiment that the preceding sets include SSBs and/or NZP-CSI-RS resources.

Similarly, the preceding interference measurement resource setting is NZP-CSI-RS resource setting2 for IM. However, it is not excluded in this embodiment that an interference resource setting is CSI-IM resource setting3 for IM. That is, the methods for NZP-CSI-RS resource setting2 for IM are also applicable to CSI-IM resource setting3 for IM.

In an embodiment, one resource setting for CM includes one CMR set and corresponds to one NZP-CSI-RS resource setting2 for IM and one CSI-IM resource setting3 for IM.

In the preceding schemes, one channel measurement resource corresponds to one SINR. It is not excluded in this embodiment that the one channel measurement resource corresponds to multiple SINR/CQI/RSRQs (that is, channel qualities). Each channel quality corresponds to one of multiple interference measurement resources corresponding to the one channel quality. The terminal selects an SINR from multiple SINRs and reports an index of an interference measurement beam corresponding to the SINR or an index of an interference measurement resource corresponding to the SINR to the base station.

Embodiment Three

This embodiment provides a method for determining an interference measurement resource. The method includes a step described below.

A first number is associated with at least one of the following information: the number of resources included in channel measurement resources, the number of pieces of spatial receive filtering information included in channel measurement resources, or group information included in a channel measurement resource set.

The first number includes one of the number of resources included in one interference measurement resource set or the number of sets included in one interference measurement resource setting.

In an embodiment, the method satisfies at least one of characteristics described below.

One channel measurement resource set corresponds to one interference measurement resource setting.

The first number is greater than or equal to the number of resources included in the channel measurement resources.

The first number is greater than or equal to the number of pieces of spatial receive filtering information included in the channel measurement resources.

The first number is greater than or equal to the number of groups included in the channel measurement resource set.

The first number is greater than or equal to the maximum number of resources included in one group in the channel measurement resource set.

An interference measurement resource corresponding to one channel measurement resource includes one interference measurement resource in each interference measurement resource set in one interference measurement resource setting.

The one interference measurement resource setting includes one or more interference measurement resource sets.

In an embodiment, the interference measurement resource sets satisfy at least one of characteristics described below.

Different interference measurement resource sets in the one interference measurement resource setting include the same number of resources.

A repetition in each of the interference measurement resource sets is configured to be on.

Resources in each of the interference measurement resource sets have the same measurement reference signal parameter information of a predetermined type. The measurement reference signal parameter information of the predetermined type includes spatial receive and/or a power parameter.

In an embodiment, the one interference measurement resource setting includes at least one of an interference measurement resource setting including NZP-CSI-RSs or an interference measurement resource setting including CSI-IM.

In an embodiment, the interference measurement resource set includes at least one of an interference measurement resource set including NZP-CSI-RSs or an interference measurement resource set including CSI-IM.

Embodiment Four

In this embodiment, a resource configuration manner, an interference resource determination manner and a reporting information determination manner are described.

In an embodiment, the following configuration manners are provided. In the following description, the number of resources included in one CMR set is N, the number of different spatial receive parameters in the one CMR set is Q, and the number of resources included in one IMR set is D, where N, Q and D are integers greater than 0.

Configuration manner one: One CMR set corresponds to P interference measurement resources (hereinafter referred to as the IMR set), where N and P are positive integers greater than 1.

Configuration manner two: One CMR set corresponds to P IMR sets, where P is equal to 1 and N is greater than 1.

Configuration manner three: One CMR set corresponds to P IMR sets, where P is greater than 1 and N is equal to 1.

Configuration manner four: One CMR set corresponds to P IMR sets, where P is equal to 1 and Nis equal to 1.

In an embodiment, in the preceding schemes, the number D of resources included in each IMR set is greater than or equal to N, and when D is equal to N, D interference measurement resources in each IMR set correspond to N channel measurement resources in the CMR set in sequence. Alternatively, the number of resources included in each IMR set is greater than or equal to Q. When the number is equal to Q, Q interference measurement resources in each IMR set correspond to Q channel measurement resource groups in the CMR set in sequence, where channel measurement resources in the same channel measurement resource group satisfy a quasi co-location relationship with respect to a spatial receive parameter/can be simultaneously received by a terminal, and channel measurement resources in different channel measurement resource groups do not satisfy the quasi co-location relationship with respect to the spatial receive parameter/cannot be simultaneously received by the terminal. Alternatively, when the number is equal to Q, Q interference measurement resources in each IMR set correspond to Q channel measurement resources in one channel measurement resource group in the CMR set in sequence, where channel measurement resources in different channel measurement resource groups satisfy the quasi co-location relationship with respect to the spatial receive parameter/can be simultaneously received by the terminal, and channel measurement resources in the same channel measurement resource group do not satisfy the quasi co-location relationship with respect to the spatial receive parameter/cannot be simultaneously received by the terminal. In an embodiment, different CRI/SSBIndexes of CMRs correspond to different channel measurement beams and P sets correspond to P interference measurement beams.

In an embodiment, each of the P IMR sets satisfies at least one of characteristics described below. A repeated sending parameter repetition is configured in the interference measurement resource set. In an embodiment, when at least one of D/N/Q is greater than 1, the repeated sending parameter repetition in the interference measurement resource set is configured to be on, and when D/N/Q is equal to 1, no repetition is configured. A set composed of interference measurement resources configured with quasi co-location reference signals with respect to the spatial receive parameter in the interference measurement resource set is an empty set, that is, each resource in the IMR set is configured with no quasi co-location reference signal with respect to the spatial receive parameter. Different interference measurement resource sets of the P interference measurement resource sets include the same number of resources. The P interference measurement resource sets belong to one interference measurement resource setting corresponding to the one channel measurement resource set, where the one interference measurement resource setting includes a CSI-IM resource setting for interference measurement and/or an NZP-CSI-RS resource setting for interference measurement.

The interference resource determination manner includes manners described below.

Interference resource determination manner one: Each CM resource (hereinafter referred to as CMR) in the one CMR set corresponds to the P interference measurement resources, and different interference measurement resources of the P interference measurement resources (hereinafter referred to as IMRs) are from different interference measurement resources in the P interference measurement resource sets. Each CMR corresponds to one SINR, where the one SINR is obtained based on one CMR and P IMRs, that is, when the one SINR is calculated, an interference measurement beam corresponding to one channel measurement beam includes the P interference measurement beams.

Interference resource determination manner two: Each CM resource (hereinafter referred to as CMR) in the one CMR set corresponds to the P interference measurement resources, and different interference measurement resources of the P interference measurement resources (hereinafter referred to as IMRs) are from different interference measurement resources in the P interference measurement resource sets. Each CMR corresponds to P SINRs, where one of the P SINRs is obtained based on one CMR and one IMR. That is, when one of the P SINRs is calculated, an interference measurement beam corresponding to one channel measurement beam is one of the P interference measurement beams.

A CSI reporting information determination manner includes manners described below.

CSI reporting information determination manner 1-1: Each CMR corresponds to P SINRs, where the P SINRs corresponding to the each CMR are obtained according to the preceding interference resource determination manner two, there are N*P SINRs in total, and K SINRs (for example, maximum K SINRs) are selected from the N*P SINRs so that CRI/SSBIndexes, IMR set indexes or SINRs corresponding to the K SINRs are reported. K is a positive integer greater than or equal to 1 and a value of K may be fixed or configured by a base station. If the CMR set includes NZP-CSI-RS resources, CSI-RS resource indicators (CRIs) are reported. If the CMR set includes SSBs, the SSBIndexes are reported. In this manner, the base station obtains an optimal combination of a channel beam and an interference beam.

CSI reporting information determination manner 1-2: When P is equal to 1, the IMR set does not need to be reported so that only K (CRI/SSBIndexes, SINRs) need to be reported. That is, the IMR set indexes are represented by using $\lceil \log_2 P \rceil$ bits so that when P=1, $\lceil \log_2 P \rceil$=0 and the IMR set index does not need to be reported. That is, only one interference measurement beam is used in this case, and the terminal does not need to select one of the interference measurement beams when the one SINR is calculated. Alternatively, even if P is greater than 1, all the interference measurement beams are used as interference measurement beams when interference resource determination manner one is used. One CMR corresponds to only one SINR, and the IMR set indexes do not need to be reported. That is, an interference beam does not need to be selected in this case so that the IMR set indexes do not need to be reported.

It can be obtained from CSI reporting information determination manner 1-1 and CSI reporting information determination manner 1-2 that whether to report the IMR sets is determined according to whether P is greater than 1 or whether the interference resource determination manner is one or two.

CSI reporting information determination manner 2-1: One RSRP value is obtained according to each CRI/SSBIndex among N CRI/SSBIndexes in the CMR set, that is, there are N RSRP values in total. K1 RSRP values are selected from the N RSRP values to obtain K1 (CRI/SSBIndexes, RSRP values). Each CMR of the K1 CRI/SSBIndexes corresponds to P SINRs according to interference resource determination manner two and K2 SINRs are selected from the P SINRs so that each CMR of the K1 CRI/SSBIndexes corresponds to K2 SINRs (of course, each CMR may correspond to a different number of SINRs). Therefore, the K1 (CRI/SSBIndexes, RSRP values) are reported and K1*K2 (CRI/SSBIndexes, IMR set indexes, SINRs) are reported. Optionally, the number of different CRI/SSBIndexes among the K1*K2 CRI/SSBIndexes is K1 so that K1 combinations of (CRI/SSBIndex, RSRP, K2 IMR set indexes, K2 SINRs) may be reported, or K1 combinations of {CRI/SSBIndex, RSRP, K2 (IMR set indexes, SINRs)} are reported.

CSI reporting information determination manner 2-2: When P is equal to 1, the IMR set does not need to be reported so that only K1 combinations of (CRI/SSBIndex, RSRP, K2 SINRs) need to be reported. That is, only one interference measurement beam is used in this case, and the terminal does not need to select one of the interference measurement beams when the one SINR is calculated. Alternatively, even if P is greater than 1, all the interference measurement beams are used as interference measurement beams when interference resource determination manner one is used. In this case, IMR set indexes do not need to be reported. That is, the interference beam does not need to be selected in this case so that the IMR set indexes do not need to be reported.

It can be obtained from CSI reporting information determination manner 2-1 and CSI reporting information determination manner 2-2 that whether to report the IMR sets is determined according to whether P is greater than 1 or whether the interference resource determination manner is one or two.

CSI reporting information determination manner 3: For example, the resource configuration manner is configuration manner three, that is, in this case, only one channel measurement resource is used and P interference measurement resources are used. Each interference measurement resource set includes one interference measurement resource so that there are P SINRs. Each SINR is obtained according to one CMR in the CMR set and one resource in one of the P interference measurement resource sets. The terminal selects K SINRs and reports K (IMR set indexes, SINRs). In an embodiment, if N and P are equal to 1, only the SINR is reported. Alternatively, only the SINRs are reported when the interference resource determination manner is manner one.

CSI reporting information determination manner 4: For example, the resource configuration manner is configuration manner four, that is, in this case, only one channel measurement resource is used, P=1 and the one interference measurement resource set includes one interference measurement resource. That is, only one channel measurement resource is used and only one interference measurement resource is used so that RSRP obtained based on the one channel measurement resource and/or an SINR obtained based on the one channel measurement resource and the one interference measurement resource are reported.

In the preceding schemes, if the IMR set is an NZP-CSI-RS set and the one CMR set corresponds to P NZP-CSI-RS-for-IMR sets and one CSI-IM set, where the number of CSI-IM resources in the CSI-IM set is greater than or equal to N/Q, one SINR is obtained based on one CMR, one NZP-CSI-RS-for-IM resource in one of the P NZP-CSI-RS-for-IMR sets and one CSI-IM resource.

However, if the IMR set is the CSI-IM set and the NZP-CSI-RS-for-IMR set, that is, one CMR set corresponds to P1 CSI-IM sets and P2 NZP-CSI-RS-for-IMR sets, two IMR set indexes need to be reported in the preceding schemes for reporting the IMR sets, which include a CSI-IM set index and an NZP-CSI-RS-for-IMR set index.

Embodiment Five

In this embodiment, a resource configuration manner, an interference resource determination manner and a reporting information determination manner are described.

In an embodiment, the following configuration manners are provided. In the following description, the number of resources included in one CMR set is N, the number of different spatial receive parameters in the one CMR set is Q, and the number of resources included in one IMR set is D, where N, Q and D are integers greater than 0.

Configuration manner one: One CMR set corresponds to P interference measurement resources (hereinafter referred to as the IMR set), where N and D are positive integers greater than 1.

Configuration manner two: One CMR set corresponds to P IMR sets, where D is equal to 1 and N is greater than 1.

Configuration manner three: One CMR set corresponds to P IMR sets, where D is greater than 1 and N is equal to 1.

Configuration manner four: One CMR set corresponds to P IMR sets, where D is equal to 1 and Nis equal to 1.

In an embodiment, in the preceding schemes, P is greater than or equal to N, and when P is equal to N, the P IMR sets correspond to N channel measurement resources in the CMR set in sequence. Alternatively, P is greater than or equal to Q. When P is equal to Q, the P IMR sets correspond to Q channel measurement resource groups in the CMR set in sequence, where channel measurement resources in the same channel measurement resource group satisfy a quasi co-location relationship with respect to a spatial receive parameter/can be simultaneously received by a terminal, and channel measurement resources in different channel measurement resource groups do not satisfy the quasi co-location relationship with respect to the spatial receive parameter/cannot be simultaneously received by the terminal. Alternatively, when P is equal to Q, the P IMR sets correspond to Q channel measurement resources in one channel measurement resource group in the CMR set in sequence, where channel measurement resources in different channel measurement resource groups satisfy the quasi co-location relationship with respect to the spatial receive parameter/can be simultaneously received by the terminal, and channel measurement resources in the same channel measurement resource group do not satisfy the quasi co-location relationship with respect to the spatial receive parameter/cannot be simultaneously received by the terminal. In an embodiment, different CRI/SSBIndexes of CMRs correspond to different channel measurement beams and D measurement reference signals in one set correspond to D interference measurement beams.

In an embodiment, each of the P IMR sets satisfies at least one of characteristics described below. A repeated sending parameter repetition is configured in the interference measurement resource set. In an embodiment, when at least one of N/D/P is greater than 1, the repeated sending parameter repetition in the interference measurement resource set is configured to be off. Resources in the interference measurement resource set satisfy the quasi co-location relationship with respect to the spatial receive parameter. Different interference measurement resource sets of the P interference measurement resource sets include the same number of resources. The P interference measurement resource sets belong to one interference measurement resource setting corresponding to the one channel measurement resource set, where the one interference measurement resource setting includes a CSI-IM resource setting for interference measurement and/or an NZP-CSI-RS resource setting for interference measurement.

The interference resource determination manner includes manners described below.

Interference resource determination manner one: Each CM resource (hereinafter referred to as CMR) in the one CMR set corresponds to D interference measurement resources, and the D interference measurement resources (hereinafter referred to as IMRs) include D interference measurement resources in one of the P interference measurement resource sets, which corresponds to the CMRs. Each CMR corresponds to one SINR, where the one SINR is obtained based on one CMR and D IMRs, that is, when the one SINR is calculated, an interference measurement beam corresponding to one channel measurement beam includes the D interference measurement beams.

Interference resource determination manner two: Each CM resource (hereinafter referred to as CMR) in the one CMR set corresponds to D interference measurement resources, and the D interference measurement resources (hereinafter referred to as IMRs) include D interference measurement resources in one of the P interference measurement resource sets, which corresponds to the CMRs. Each CMR corresponds to D SINRs, where one of the D SINRs is obtained based on one CMR and one IMR. That is, when one of the D SINRs is calculated, an interference measurement beam corresponding to one channel measurement beam is one of the D interference measurement beams.

A CSI reporting information determination manner includes manners described below.

CSI reporting information determination manner 1-1: Each CMR corresponds to D SINRs, where the D SINRs corresponding to the each CMR are obtained according to the preceding interference resource determination manner two, there are N*D SINRs in total, and K SINRs (for example, maximum K SINRs) are selected from the N*D SINRs so that CRI/SSBIndexes, IMIs or SINRs corresponding to the K SINRs are reported. K is a positive integer greater than or equal to 1 and a value of K may be fixed or configured by a base station. If the CMR set includes NZP-CSI-RS resources, CSI-RS resource indicators (CRIs) are reported. If the CMR set includes SSBs, the SSBIndexes are reported. The IMIs are indexes of the IMRs corresponding to the SINRs in the IMR set so that the base station obtains an optimal combination of a channel beam and an interference beam.

CSI reporting information determination manner 1-2: When D is equal to 1, the IMI does not need to be reported so that only K (CRI/SSBIndexes, SINRs) need to be reported. That is, only one interference measurement beam is used in this case, and the terminal does not need to select one of the interference measurement beams when one SINR is calculated. Alternatively, even if D is greater than 1, all the interference measurement beams are used as interference measurement beams when interference resource determination manner one is used. In this case, the IMIs do not need to be reported. That is, an interference beam does not need to be selected in this case so that the IMIs do not need to be reported.

CSI reporting information determination manner 2-1: One RSRP value is obtained according to each CRI among N CRIB in the CMR set, that is, there are N RSPR values in total. K1 RSRP values are selected from the N RSRP values so that K1 (CRI/SSBIndexes, RSRP values) are obtained. Each CMR of the K1 CRI/SSBIndexes corresponds to D SINRs according to interference resource determination manner two and K2 SINRs are selected from the D SINRs so that each CMR of the K1 CRI/SSBIndexes corresponds to K2 SINRs (of course, different CMRs may correspond to different values of K2). Therefore, the K1 (CRI/SSBIndexes, RSRP values) are reported and K1*K2 (CRI/SSBIndexes, IMIs, SINRs) are reported. Optionally, the number of different CRI/SSBIndexes among the K1*K2 CRI/SSBIndexes is K1 so that K1 combinations of (CRI/SSBIndex, RSRP, K2 IMIs, K2 SINRs) may be reported, or K1 combinations of {CRI/SSBIndex, RSRP, K2 (IMIs, SINRs)} are reported.

CSI reporting information determination manner 2-2: When D is equal to 1, the IMI does not need to be reported so that only K1 combinations of (CRI/SSBIndex, RSRP, K2 SINRs) need to be reported. That is, only one interference measurement beam is used in this case, and the terminal does not need to select one of the interference measurement beams when one SINR is calculated. Alternatively, even if D is greater than 1, all the interference measurement beams are used as interference measurement beams when interference resource determination manner one is used. In this case, the IMIs do not need to be reported. That is, the interference beam does not need to be selected in this case so that the IMR set indexes do not need to be reported.

It can be obtained from CSI reporting information determination manner 2-1 and CSI reporting information determination manner 2-2 that whether to report the IMIs is determined according to whether D is greater than 1 or whether the interference resource determination manner is one or two.

CSI reporting information determination manner 3: For example, the resource configuration manner is configuration manner three, that is, in this case, only one channel measurement resource is used and D interference measurement resources are used. Each interference measurement resource set includes one interference measurement resource so that there are D SINRs. Each SINR is obtained according to one CMR in the CMR set and one resource in one of the P interference measurement resource sets. The terminal selects K SINRs and reports K (IMIs, SINRs). In an embodiment, if N and P are equal to 1, only the SINR is reported. Alternatively, only the SINRs are reported when the interference resource determination manner is manner one.

CSI reporting information determination manner 4: For example, the resource configuration manner is configuration manner four, that is, in this case, only one channel measurement resource is used and only one interference measurement resource is used (D=1) so that only the SINR and/or the RSRP may be reported.

In the preceding schemes, if the IMR set is an NZP-CSI-RS set and the one CMR set corresponds to P NZP-CSI-RS-for-IMR sets and one CSI-IM set, where the number of resources in the CSI-IM set is greater than or equal to N/Q, one SINR is obtained based on one CMR, one NZP-CSI-RS-for-IM resource in one of the P NZP-CSI-RS-for-IMR sets and one CSI-IM resource. In this case, two IMIs do not need to be reported.

However, if the IMR set is the CSI-IM set and the NZP-CSI-RS-for-IMR set, that is, one CMR set corresponds to P1 CSI-IM sets and P2 NZP-CSI-RS-for-IMR sets, two IMIs need to be reported in the preceding schemes for reporting the IMIs, which include a CSI-IM resource index in CSI-IM set and an NZP-CSI-RS-for-IM resource index in NZP-CSI-RS-for-IM set.

How to acquire quasi co-location reference signals of a channel and/or a signal when a time interval between control signaling for scheduling the channel and/or the signal and the channel and/or the signal is less than a predetermined value is also a problem to be solved.

Another embodiment of the present disclosure provides an information element processing method. The method includes at least one of steps described below.

In the case where a time interval between control information for scheduling a first-type information element and the first-type information element is less than a predetermined threshold and a predetermined condition is satisfied, quasi co-location information of the first-type information element is acquired according to quasi co-location information of a second-type information element.

In the case where a predetermined condition is not satisfied, it is determined that a time interval between the control information for scheduling the first-type information element and the first-type information element is greater than or equal to a predetermined threshold.

In the case where a time interval between control information for scheduling a first-type information element and the first-type information element is less than a predetermined threshold and a predetermined condition is not satisfied, the first-type information element is processed in a predetermined processing manner.

The information element includes at least one of a channel or a signal. The first-type information element is, for example, an aperiodic channel state information-reference signal (AP-CSI-RS).

In an embodiment of the present disclosure, the predetermined condition includes at least one of conditions described below.

The first-type information element satisfies a first characteristic.

The second-type information element satisfies a second characteristic.

The first-type information element and the second-type information element satisfy a third characteristic.

In an embodiment of the present disclosure, the second characteristic includes at least one of characteristics described below.

The second-type information element belongs to a predetermined type information element.

A quasi co-location reference signal of the second-type information element belongs to a predetermined type information element.

Second-type information elements belonging to different time domain symbols occupied by the first-type information element satisfy a quasi co-location relationship with respect to a first-type quasi co-location parameter.

In an embodiment of the present disclosure, the information element of the predetermined type includes at least one of a periodic information element or a tracking reference signal.

TRS-info is configured in configuration information of a reference signal.

In an embodiment of the present disclosure, the first characteristic includes at least one of characteristics described below.

The number of time domain symbols occupied by the first-type information element is less than a predetermined value.

The number of time domain symbols occupied by the first-type information element in one time unit is less than a predetermined value.

A quasi co-location parameter set associated with the first-type information element belongs to a third-type quasi co-location parameter.

A repetition parameter repetition is configured in configuration information corresponding to a first-type signal.

In an embodiment of the present disclosure, the third characteristic includes at least one of characteristics described below.

The second-type information element and the first-type information element are in the same frequency domain bandwidth, where the frequency domain bandwidth includes at least one of a component carrier (CC) or a bandwidth part (BWP).

A quasi co-location parameter set associated with the second-type information element includes the quasi co-location parameter set associated with the first-type information element.

A difference between a quasi co-location parameter set associated with the second-type information element and the quasi co-location parameter set associated with the first-type information element is empty.

The second-type information elements belonging to the different time domain symbols occupied by the first-type information element satisfy the quasi co-location relationship with respect to the first-type quasi co-location parameter.

Second-type information elements belonging to consecutive time domain symbols occupied by the first-type information element satisfy the quasi co-location relationship with respect to the first-type quasi co-location parameter.

Second-type information elements belonging to non-consecutive time domain symbols occupied by the first-type information element satisfy the quasi co-location relationship with respect to the first-type quasi co-location parameter.

The quasi co-location parameter set associated with the first-type information element belongs to a quasi co-location parameter set associated with the second-type information element.

First group information corresponding to the first-type information element and second group information corresponding to the second-type information element satisfy a predetermined characteristic.

An intersection between a set of time domain symbols occupied by the second-type information element and a set of time domain symbols occupied by the first-type information element is non-empty.

A second-type channel includes a control channel in a control channel resource with a predetermined control channel resource index in a time unit latest to the first-type information element. The predetermined control channel resource index includes any one of a minimum control channel resource index or a maximum control channel resource index.

The time domain symbols being consecutive include one of the following: the time domain symbols have consecutive indexes in one time unit or the time domain symbols have consecutive relative indexes in a set of time domain symbols occupied by the first-type information element in one time unit.

The time unit includes a slot.

In an embodiment of the present disclosure, that the first group information associated with the first-type information element and the second group information associated with the second-type information element satisfy the predetermined characteristic includes at least one of cases described below.

The first group information is the same as or different from the second group information.

In the case where quasi co-location information of the first-type information element associated with a fourth-type quasi co-location parameter is acquired according to quasi co-location information of the second-type information element associated with the fourth-type quasi co-location parameter, the first group information associated with the first-type information element and the second group information associated with the second-type information element satisfy the predetermined characteristic, where the fourth-type quasi co-location parameter does not include a spatial receive parameter.

In an embodiment of the present disclosure, i-th group information associated with an i-th type information element includes at least one of: an i-th information element group to which the i-th type information element belongs; an i-th control channel resource group to which a control channel for scheduling the i-th type information element belongs; an i-th reference signal group where a quasi co-location reference signal of the i-th type information element is located; or an i-th antenna group of a communication node corresponding to the i-th type information element, where the communication node is a communication node that transmits the i-th type information element. In the above, i is 1 or 2.

In an embodiment of the present disclosure, the step in which the quasi co-location information of the first-type information element is acquired according to the quasi co-location information of the second-type information element includes one of steps described below.

The quasi co-location information of the first-type information element is acquired according to the quasi co-location information of the second-type information element on a time domain symbol where the first-type information element is located.

The quasi co-location information of the first-type information element is acquired according to the quasi co-location information of the second-type information element on a time domain symbol with the second-type information element among time domain symbols where the first-type information element is located.

The quasi co-location information of the first-type information element is acquired according to quasi co-location information of the control channel resource with the predetermined control channel resource index in the time unit latest to the first-type information element, where the second-type information element includes the control channel resource.

The quasi co-location information of the first-type information element is acquired according to the quasi co-location information of the second-type information element on a time domain symbol with a predetermined time domain symbol index in a set of time domain symbols with the second-type information element among time domain symbols where the first-type information element is located. The predetermined time domain symbol index includes any one of a minimum time domain symbol index or a maximum time domain symbol index.

Quasi co-location information on a group of consecutive time domain symbols of the first-type information element is acquired according to the quasi co-location information of the second-type information element on a time domain symbol with a predetermined time domain symbol index in a set of time domain symbols with the second-type information element in the group of consecutive time domain symbols.

Quasi co-location information on a group of non-consecutive time domain symbols of the first-type information element is acquired according to the quasi co-location information of the second-type information element on a time domain symbol with a predetermined time domain symbol index in a set of time domain symbols with the second-type information element in the group of non-consecutive time domain symbols.

In an embodiment of the present disclosure, the quasi co-location information includes at least one of a quasi co-location reference signal associated with the first-type quasi co-location parameter or the first-type quasi co-location parameter, where the first-type quasi co-location parameter includes the spatial receive parameter.

In an embodiment of the present disclosure, the step in which in the case where the predetermined condition is not satisfied, the first-type information element is processed in the predetermined processing manner includes at least one of steps described below.

The first-type information element is not transmitted.

An information element set where the first-type information element is located is not transmitted.

Channel state information obtained based on the first-type information element is not transmitted.

The quasi co-location information of the first-type information element is acquired according to the quasi co-location information of the control channel resource with the predetermined control channel resource index in the time unit latest to the first-type information element, where an intersection between the second-type information element and the first-type information element is non-empty.

Quasi co-location information of the first-type information element associated with the third-type quasi co-location parameter is acquired according to quasi co-location information of the second-type information element associated with the third-type quasi co-location parameter.

Quasi co-location information of the first-type information element associated with a second-type quasi co-location parameter is acquired according to information indicated in the control information for scheduling the first-type information element.

Quasi co-location information belonging to a predetermined difference in the quasi co-location parameter set associated with the first-type information element is acquired according to information indicated in the control information for scheduling the first-type information element.

Quasi co-location information of the first-type information element associated with a second-type quasi co-location parameter is acquired according to quasi co-location information of the control channel resource with the predetermined control channel resource index in the time unit latest to the first-type information element, where the quasi co-location information of the control channel resource is associated with the second-type quasi co-location parameter.

In an embodiment of the present disclosure, the third-type quasi co-location parameter includes at least one of the following quasi co-location parameters: the spatial receive parameter, a Doppler shift or an average delay; or the third-type quasi co-location parameter includes an intersection between the quasi co-location parameter set associated with the first-type information element and the quasi co-location parameter set associated with the second-type information element.

Additionally/alternatively, the second-type quasi co-location parameter includes at least one of the following quasi co-location parameters: a Doppler spread, a delay spread or an average gain; or the second-type quasi co-location parameter includes a difference between the quasi co-location parameter set associated with the first-type information element and the quasi co-location parameter set associated with the second-type information element.

Another embodiment of the present disclosure provides an information element processing apparatus. The apparatus includes a processing module.

The processing module is configured to perform at least one of operations described below.

In the case where a time interval between control information for scheduling a first-type information element and the first-type information element is less than a predetermined threshold and a predetermined condition is satisfied, quasi co-location information of the first-type information element is acquired according to quasi co-location information of a second-type information element.

In the case where a predetermined condition is not satisfied, it is determined that a time interval between the control information for scheduling the first-type information element and the first-type information element is greater than or equal to a predetermined threshold.

In the case where a time interval between control information for scheduling a first-type information element and the first-type information element is less than a predetermined threshold and a predetermined condition is not satisfied, the first-type information element is processed in a predetermined processing manner.

The information element includes at least one of a channel or a signal. The first-type information element is, for example, an AP-CSI-RS.

In an embodiment of the present disclosure, the predetermined condition includes at least one of conditions described below.

The first-type information element satisfies a first characteristic.

The second-type information element satisfies a second characteristic.

The first-type information element and the second-type information element satisfy a third characteristic.

In an embodiment of the present disclosure, the second characteristic includes at least one of characteristics described below.

The second-type information element belongs to a predetermined type information element.

A quasi co-location reference signal of the second-type information element belongs to a predetermined type information element.

Second-type information elements belonging to different time domain symbols occupied by the first-type information element satisfy a quasi co-location relationship with respect to a first-type quasi co-location parameter.

In an embodiment of the present disclosure, the information element of the predetermined type includes at least one of a periodic information element or a tracking reference signal.

TRS-info is configured in configuration information of a reference signal.

In an embodiment of the present disclosure, the first characteristic includes at least one of characteristics described below.

The number of time domain symbols occupied by the first-type information element is less than a predetermined value.

The number of time domain symbols occupied by the first-type information element in one time unit is less than a predetermined value.

A quasi co-location parameter set associated with the first-type information element belongs to a third-type quasi co-location parameter.

A repetition parameter repetition is configured in configuration information corresponding to a first-type signal.

In an embodiment of the present disclosure, the third characteristic includes at least one of characteristics described below.

The second-type information element and the first-type information element are in the same frequency domain bandwidth.

A quasi co-location parameter set associated with the second-type information element includes the quasi co-location parameter set associated with the first-type information element. The frequency domain bandwidth includes at least one of a CC or a BWP.

A difference between a quasi co-location parameter set associated with the second-type information element and the quasi co-location parameter set associated with the first-type information element is empty.

The second-type information elements belonging to the different time domain symbols occupied by the first-type information element satisfy the quasi co-location relationship with respect to the first-type quasi co-location parameter.

Second-type information elements belonging to consecutive time domain symbols occupied by the first-type information element satisfy the quasi co-location relationship with respect to the first-type quasi co-location parameter.

Second-type information elements belonging to non-consecutive time domain symbols occupied by the first-type information element satisfy the quasi co-location relationship with respect to the first-type quasi co-location parameter.

The quasi co-location parameter set associated with the first-type information element belongs to a quasi co-location parameter set associated with the second-type information element.

First group information corresponding to the first-type information element and second group information corresponding to the second-type information element satisfy a predetermined characteristic.

An intersection between a set of time domain symbols occupied by the second-type information element and a set of time domain symbols occupied by the first-type information element is non-empty.

A second-type channel includes a control channel in a control channel resource with a predetermined control channel resource index in a time unit latest to the first-type information element.

The time domain symbols being consecutive include one of the following: the time domain symbols have consecutive indexes in one time unit or the time domain symbols have consecutive relative indexes in a set of time domain symbols occupied by the first-type information element in one time unit.

In an embodiment of the present disclosure, that the first group information associated with the first-type information element and the second group information associated with the second-type information element satisfy the predetermined characteristic includes at least one of cases described below.

The first group information is the same as or different from the second group information.

In the case where quasi co-location information of the first-type information element associated with a fourth-type quasi co-location parameter is acquired according to quasi co-location information of the second-type information element associated with the fourth-type quasi co-location parameter, the first group information associated with the first-type information element and the second group information associated with the second-type information element satisfy the predetermined characteristic, where the fourth-type quasi co-location parameter does not include a spatial receive parameter.

In an embodiment of the present disclosure, i-th group information associated with an i-th type information element includes at least one of: an i-th information element group to which the i-th type information element belongs; an i-th control channel resource group to which a control channel for scheduling the i-th type information element belongs; an i-th reference signal group where a quasi co-location reference signal of the i-th type information element is located; or an i-th antenna group of a communication node corresponding to the i-th type information element, where the communication node is a communication node that transmits the i-th type information element. In the above, i is 1 or 2.

In an embodiment of the present disclosure, the operation in which the quasi co-location information of the first-type information element is acquired according to the quasi co-location information of the second-type information element includes one of operations described below.

The quasi co-location information of the first-type information element is acquired according to the quasi co-location information of the second-type information element on a time domain symbol where the first-type information element is located.

The quasi co-location information of the first-type information element is acquired according to the quasi co-location information of the second-type information element on a time domain symbol with the second-type information element among time domain symbols where the first-type information element is located.

The quasi co-location information of the first-type information element is acquired according to quasi co-location information of the control channel resource with the predetermined control channel resource index in the time unit latest to the first-type information element, where the second-type information element includes the control channel resource.

The quasi co-location information of the first-type information element is acquired according to the quasi co-location information of the second-type information element on a time domain symbol with a predetermined time domain symbol index in a set of time domain symbols with the second-type information element among time domain symbols where the first-type information element is located.

Quasi co-location information on a group of consecutive time domain symbols of the first-type information element is acquired according to the quasi co-location information of the second-type information element on a time domain symbol with a predetermined time domain symbol index in a set of time domain symbols with the second-type information element in the group of consecutive time domain symbols.

Quasi co-location information on a group of non-consecutive time domain symbols of the first-type information element is acquired according to the quasi co-location information of the second-type information element on a time domain symbol with a predetermined time domain symbol index in a set of time domain symbols with the second-type information element in the group of non-consecutive time domain symbols.

In an embodiment of the present disclosure, the quasi co-location information includes at least one of a quasi co-location reference signal associated with the first-type quasi co-location parameter or the first-type quasi co-location parameter, where the first-type quasi co-location parameter includes the spatial receive parameter.

In an embodiment of the present disclosure, the operation in which in the case where the predetermined condition is not satisfied, the first-type information element is processed in the predetermined processing manner includes at least one of operations described below.

The first-type information element is not transmitted.

An information element set where the first-type information element is located is not transmitted.

Channel state information obtained based on the first-type information element is not transmitted.

The quasi co-location information of the first-type information element is acquired according to the quasi co-location information of the control channel resource with the predetermined control channel resource index in the time unit latest to the first-type information element, where an intersection between the second-type information element and the first-type information element is non-empty.

Quasi co-location information of the first-type information element associated with the third-type quasi co-location parameter is acquired according to quasi co-location information of the second-type information element associated with the third-type quasi co-location parameter.

Quasi co-location information of the first-type information element associated with a second-type quasi co-location parameter is acquired according to information indicated in the control information for scheduling the first-type information element.

Quasi co-location information belonging to a predetermined difference in the quasi co-location parameter set associated with the first-type information element is acquired according to information indicated in the control information for scheduling the first-type information element.

Quasi co-location information of the first-type information element associated with a second-type quasi co-location parameter is acquired according to quasi co-location information of the control channel resource with the predetermined control channel resource index in the time unit latest to the first-type information element, where the quasi co-location information of the control channel resource is associated with the second-type quasi co-location parameter.

In an embodiment of the present disclosure, the third-type quasi co-location parameter includes at least one of the following quasi co-location parameters: the spatial receive parameter, a Doppler shift or an average delay; or the third-type quasi co-location parameter includes an intersection between the quasi co-location parameter set associated with the first-type information element and the quasi co-location parameter set associated with the second-type information element.

Additionally/alternatively, the second-type quasi co-location parameter includes at least one of the following quasi co-location parameters: a Doppler spread, a delay spread or an average gain; or the second-type quasi co-location parameter includes a difference between the quasi co-location parameter set associated with the first-type information element and the quasi co-location parameter set associated with the second-type information element.

Another embodiment of the present disclosure provides an information element processing apparatus. The information element processing apparatus includes a processor and a computer-readable storage medium, where the computer-readable storage medium stores an instruction which, when executed by the processor, implements any one of the information element processing methods described above.

Another embodiment of the present disclosure provides a computer-readable storage medium. The computer-readable storage medium stores a computer program which, when executed by a processor, implements steps of any one of the information element processing methods described above.

Embodiment Six

Figure 7:
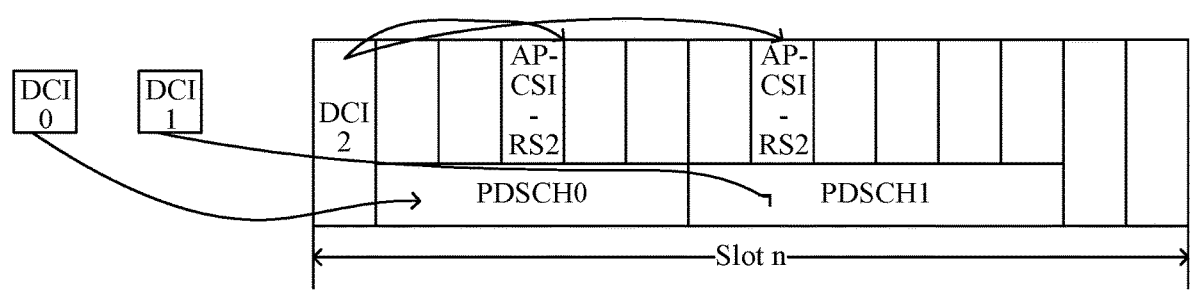
FIG. 7 is schematic diagram one of occupancy of third-type channels on time domain symbols where an aperiodic measurement reference signal is located.

In this embodiment, a method for acquiring quasi co-location information of an aperiodic channel state information-reference signal (AP-CSI-RS) and/or quasi co-location information of a PDSCH is described, as shown in FIG. 7. In the following description, the AP-CSI-RS (that is, a first-type information element) is used as an example. The quasi co-location information of the PDSCH scheduled by DCI may be acquired by a similar method.

An interval between downlink control information (DCI) for scheduling the AP-CSI-RS and the AP-CSI-RS is less than a predetermined threshold K, where a value of K includes time for a terminal to decode the DCI and time for the terminal to switch a beam to a receive beam of the AP-CSI-RS and indicated in the DCI. When receiving the AP-CSI-RS, the terminal is ignorant of a QCL parameter of the AP-CSI-RS and even ignorant of whether the AP-CSI-RS is scheduled by a base station since the DCI has not been correctly decoded. If a third-type channel and/or signal is present on a time domain symbol/moment where the AP-CSI-RS is located, where the third-type channel and/or signal has been determined to be present when the terminal buffers data on the time domain symbol/moment where the AP-CSI-RS is located, the quasi co-location information of the AP-CSI-RS is preferably acquired according to quasi co-location information of the third-type channel and/or signal.

For example, an interval between DCI for scheduling the third-type channel/signal and the third-type channel/signal is greater than K1. The third-type channel/signal includes a PDSCH/DMRS/PTRS dynamically scheduled by the DCI, and/or a PDSCH/DMRS/PTRS semi-persistently scheduled; an interval between DCI for scheduling the third-type signal and the third-type signal is greater than K, such as the AP-CSI-RS; the third-type signal includes a periodic reference signal such as a periodic CSI-RS or an SSB/PBCH; and the third-type signal includes a semi-persistent reference signal such as a semi-persistent CSI-RS. K1 is a minimum delay reported by the terminal for receiving the PDSCH/DMRS/PTRS using information about a quasi co-location reference signal and indicated in the DCI, K is a minimum delay reported by the terminal for receiving the AP-CSI-RS using the information about the quasi co-location reference signal and indicated in the DCI, where K and K1 may have the same value or different values.

In an embodiment, as shown in FIG. 7, AP-CSI-RS2 is scheduled by DCI2, and PDSCHi is scheduled by DCIi, where i=0, 1. An interval between DCIi and PDSCHi is greater than K1, and an interval between DCI2 and AP-CSI-RS2 is less than K. As shown in FIG. 7, different third-type channels and/or signals are present on different time domain symbols occupied by one AP-CSI-RS resource, AP-CSI-RS2. For example, the third-type channel and/or signal on a fourth time domain symbol of slotn occupied by AP-CSI-RS2 is PDSCH0 and the third-type channel and/or signal on an eighth time domain symbol of slotn occupied by AP-CSI-RS2 is PDSCH1. If PDSCH0 and PDSCH1 do not satisfy a quasi co-location relationship with respect to a first-type quasi co-location parameter and the first-type quasi co-location parameter of AP-CSI-RS2 is determined according to the third-type channels and/or signals on the time domain symbols/moments where AP-CSI-RS2 is located, AP-CSI-RS2 has different first-type quasi co-location parameters on different time domain symbols. That is, one aperiodic measurement reference signal resource has different first-type quasi co-location parameters on different time domain symbols. Therefore, when the interval between the DCI for scheduling the AP-CSI-RS and the AP-CSI-RS is less than K, at least one of the following enhancement schemes needs to be adopted.

Scheme one: the terminal expects that the third-type channels and/or signals on different time domain symbols where the AP-CSI-RS resource is located satisfy the quasi co-location relationship with respect to the first-type quasi co-location parameter, for example, the third-type channels and/or signals on different time domain symbols are the same channel and/or signal, or different third-type channels and/or signals on different time domain symbols satisfy the quasi co-location relationship with respect to the first-type quasi co-location parameter.

Figure 8:
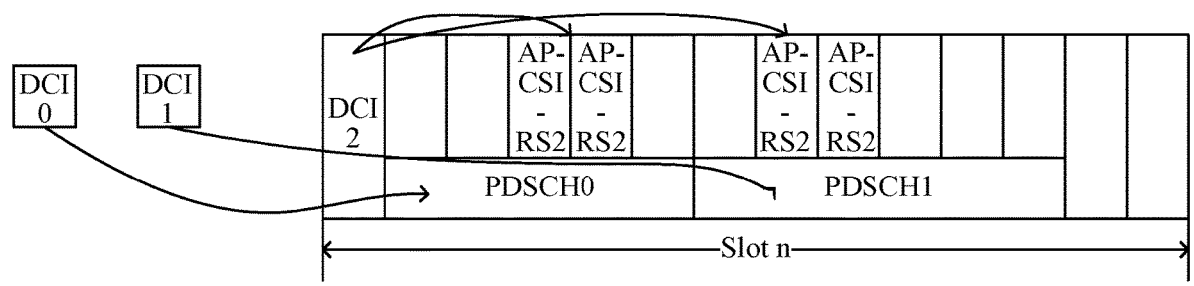
FIG. 8 is schematic diagram two of occupancy of third-type channels on time domain symbols where an aperiodic measurement reference signal is located.

Scheme two: third-type channels and/or signals on consecutive time domain symbols of the AP-CSI-RS resource satisfy the quasi co-location relationship with respect to the first-type quasi co-location parameter, and third-type channels and/or signals on non-consecutive time domain symbols do not need to satisfy the quasi co-location relationship with respect to the first-type quasi co-location parameter. As shown in FIG. 8, third-type channels and/or signals on a fourth time domain symbol and a fifth time domain symbol satisfy the quasi co-location relationship with respect to the first-type quasi co-location parameter, and third-type channels and/or signals on an eighth time domain symbol and a ninth time domain symbol satisfy the quasi co-location relationship with respect to the first-type quasi co-location parameter. The third-type channel and/or signal on the fourth time domain symbol and the fifth time domain symbol and the third-type channel and/or signal on the eighth time domain symbol and the ninth time domain symbol do not need to satisfy the quasi co-location relationship with respect to the first-type quasi co-location parameter.

Scheme three: third-type channels and/or signals on non-consecutive time domain symbols of the AP-CSI-RS resource satisfy the quasi co-location relationship with respect to the first-type quasi co-location parameter, and third-type channels and/or signals on consecutive time domain symbols do not need to satisfy the quasi co-location relationship with respect to the first-type quasi co-location parameter.

The time domain symbols being consecutive in the preceding schemes two and three include one of the following: the time domain symbols have consecutive indexes in the slot, or the time domain symbols have consecutive relative indexes in a set of time domain symbols occupied in the slot. For example, {4, 5, 8, 9} time domain symbols occupied by AP-CSI-RS2 in slotn in FIG. 8 have relative indexes {0, 1, 2, 3} in sequence. Schemes two and three enable the AP-CSI-RS resource to have different quasi co-location reference signals with respect to the first-type quasi co-location parameter in different port groups, that is, different port groups do not need to satisfy the quasi co-location relationship with respect to the first-type quasi co-location parameter. In scheme two, to enable the same antenna of the AP-CSI-RS resource to have the same quasi co-location reference signal with respect to the first-type quasi co-location parameter in different polarization directions, ports of the same antenna in different polarization directions should be mapped onto a group of consecutive time domain symbols in the case of port mapping. In scheme three, ports of the same antenna in different polarization directions should be mapped onto a group of non-consecutive time domain symbols in the case of port mapping, that is, a mapping manner of CSI-RS ports in NR in the related art.

Scheme four: one AP-CSI-RS resource occupies only one time domain symbol.

Scheme five: in the case where quasi co-location reference signals of the third-type channels and/or signals on different time domain symbols with respect to the first-type quasi co-location parameter do not satisfy the quasi co-location relationship, the AP-CSI-RS resource or a set where the AP-CSI-RS resource is located is not received or CSI reporting based on the AP-CSI-RS is not performed.

Scheme six: in the case where quasi co-location reference signals of the third-type channels and/or signals on different time domain symbols with respect to the first-type quasi co-location parameter do not satisfy the quasi co-location relationship, the quasi co-location information of the AP-CSI-RS is acquired according to quasi co-location information of a third-type channel and/or signal on a predetermined time domain symbol. For example, the quasi co-location information of the AP-CSI-RS is acquired according to quasi co-location information of a third-type channel and/or signal on a lowest time domain symbol index. The predetermined time domain symbol includes a time domain symbol latest to the AP-CSI-RS.

Scheme seven: in the case where quasi co-location reference signals of the third-type channels and/or signals on different time domain symbols with respect to the first-type quasi co-location parameter do not satisfy the quasi co-location relationship, the quasi co-location information of the AP-CSI-RS is acquired according to quasi co-location information of a control channel with a minimum control channel resource index in a time unit latest to the AP-CSI-RS.

In the preceding schemes, the first-type quasi co-location parameter includes at least a spatial Rx parameter. For example, the first-type quasi co-location parameter includes the spatial Rx parameter and at least one of a Doppler shift, an average delay, a Doppler spread, a delay spread or an average gain.

In an embodiment, when the third-type channel and/or signal is present on only part of multiple time domain symbols where the AP-CSI-RS is located, the following schemes may be used.

Scheme one: quasi co-location information on a time domain symbol where the AP-CSI-RS is located and with no third-type channel and/or signal is acquired according to quasi co-location information of a third-type channel and/or signal on a time domain symbol where the AP-CSI-RS is located and with the third-type channel and/or signal.

Scheme two: quasi co-location information on a time domain symbol where the AP-CSI-RS is located and with no third-type channel and/or signal is acquired according to quasi co-location information of a control channel resource with the minimum control channel resource index in the time unit latest to the AP-CSI-RS.

In an embodiment, the control channel resource with the minimum control channel resource index is associated with at least one search space to be detected in the time unit latest to the AP-CSI-RS.

In an embodiment, when no third-type channel and/or signal is present on the time domain symbol where the AP-CSI-RS is located, the quasi co-location information of the AP-CSI-RS is acquired according to the quasi co-location information of the control channel resource with the minimum control channel resource index in the time unit latest to the AP-CSI-RS. In the following description, a second-type channel and/or signal includes at least one of the third-type channel and/or signal or the control channel resource with the minimum control channel resource index.

In an embodiment, when the second-type channel and/or signal and the AP-CSI-RS are located in different component carriers (CCs) or bandwidth parts (BWPs), how to acquire the quasi co-location information of the AP-CSI-RS remains to be a problem. The quasi co-location relationship cannot be established between signals in different CC/BWPs with respect to a second-type quasi co-location parameter, where the second-type quasi co-location parameter does not include at least one of the spatial receive parameter, the Doppler shift, or the average delay. For example, the second-type quasi co-location parameter includes at least one of the Doppler spread, the delay spread or the average gain. Therefore, the following schemes may be provided.

Scheme one: the AP-CSI-RS and the second-type channel and/or signal are in the same CC/BWP.

Scheme two: When the second-type channel and/or signal and the AP-CSI-RS are located in different CC/BWPs, a third-type quasi co-location parameter of the AP-CSI-RS is acquired according to a third-type quasi co-location parameter of the second-type channel and/or signal, and a second-type quasi co-location parameter of the AP-CSI-RS is acquired according to information indicated in the DCI, where the third-type quasi co-location parameter includes at least one of the spatial receive parameter, the Doppler shift or the average delay.

Scheme three: When the second-type channel and/or signal and the AP-CSI-RS are located in different CC/BWPs, a quasi co-location parameter associated with the AP-CSI-RS belongs to the third-type quasi co-location parameter, that is, the AP-CSI-RS is associated with no second-type quasi co-location parameter. For example, a repeated sending parameter repetition is configured in the set where the AP-CSI-RS is located since the quasi co-location parameter of only the AP-CSI-RS configured with the repetition is a subset of the third-type quasi co-location parameter.

In an embodiment, a quasi co-location parameter set associated with a channel and/or signal represents one of a set composed of quasi co-location parameters associated with quasi co-location reference signals in a quasi co-location reference signal set configured in a transmission configuration indication (TCI) of the channel and/or signal, or a set composed of quasi co-location parameters to be configured for a type of the channel and/or signal.

In an embodiment, a difference between a quasi co-location parameter set associated with a quasi co-location reference signal associated with the second-type channel and/or signal and a quasi co-location parameter set associated with the AP-CSI-RS is non-empty. For example, the former quasi co-location parameter set is a subset of the quasi co-location parameter set associated with the AP-CSI-RS. In this case, some quasi co-location parameters of the AP-CSI-RS cannot be acquired. Therefore, the following schemes may be used.

Scheme one: When the difference is non-empty, a quasi co-location parameter of the AP-CSI-RS and belonging to a predetermined quasi co-location parameter set is acquired according to a quasi co-location parameter of the second-type channel and/or signal, and a quasi co-location parameter of the AP-CSI-RS and belonging to the difference is acquired according to the information indicated in the DCI. The predetermined quasi co-location parameter set includes an intersection between the quasi co-location parameter set associated with the second-type channel and/or signal and the quasi co-location parameter set of the AP-CSI-RS, or quasi co-location parameters in the predetermined quasi co-location parameter set belong to the third-type quasi co-location parameter.

Scheme two: The difference is limited to be empty.

Scheme three: The second-type channel and/or signal belongs to a channel and/or signal of a predetermined type such as a periodic channel and/or signal and a tracking reference signal (TRS) which is a CSI-RS configured with TRS-info.

Figure 9:
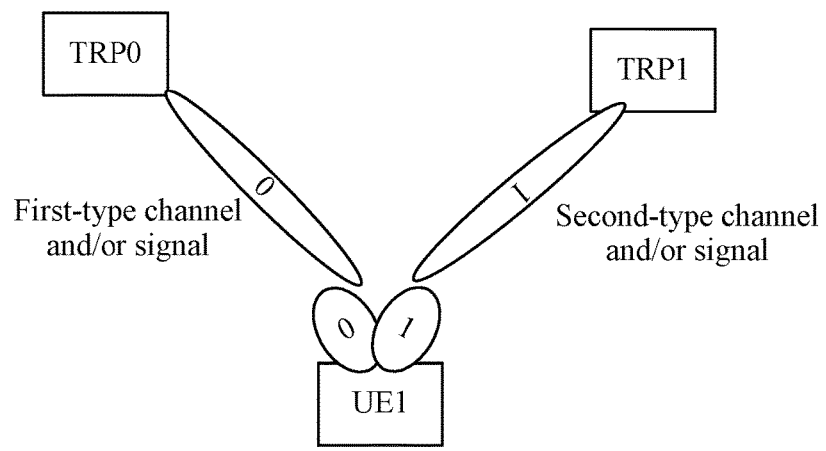
FIG. 9 is a schematic diagram illustrating that a first-type channel and/or signal and a second-type channel and/or signal are from different TRPs and a quasi co-location relationship cannot be established between the first-type channel and/or signal and the second-type channel and/or signal with respect to a fourth-type quasi co-location parameter.

In an embodiment, when the quasi co-location information of the AP-CSI-RS/PDSCH is acquired according to quasi co-location information of the second-type channel and/or signal, group information associated with the AP-CSI-RS/PDSCH and group information associated with the second-type channel and/or signal need to satisfy a predetermined characteristic. As shown in FIG. 9, if a first-type channel and/or signal and the second-type channel and/or signal are sent by different transmission nodes, quasi co-location information of the first-type channel and/or signal cannot be acquired according to the quasi co-location information of the second-type channel and/or signal, or quasi co-location information of the first-type channel and/or signal associated with a fourth-type quasi co-location parameter cannot be acquired according to quasi co-location information of the second-type channel and/or signal associated with the fourth-type quasi co-location parameter. Therefore, when the quasi co-location information of the first-type channel and/or signal associated with the fourth-type quasi co-location parameter is acquired according to the quasi co-location information of the second-type channel and/or signal associated with the fourth-type quasi co-location parameter, the first-type channel and/or signal belongs to the same TRP as the second-type channel and/or signal. In an embodiment, first group information corresponding to the first-type channel and/or signal and second group information corresponding to the second-type channel and/or signal satisfy one of characteristics described below.

A group index of the first group is the same as a group index of the second group. The quasi co-location relationship can be established between reference signals in the same group with respect to the fourth-type quasi co-location parameter, and the quasi co-location relationship cannot be established between reference signals in different groups with respect to the fourth-type quasi co-location parameter.

A group index of the first group is different from a group index of the second group. The quasi co-location relationship can be established between reference signals in different groups with respect to the fourth-type quasi co-location parameter, and the quasi co-location relationship cannot be established between reference signals in the same group with respect to the fourth-type quasi co-location parameter.

The fourth-type quasi co-location parameter does not include the spatial receive parameter or the fourth-type quasi co-location parameter includes at least one of the spatial receive parameter, the Doppler shift, the average delay, the Doppler spread, the delay spread or the average gain.

A group associated with a channel and/or signal includes at least one of: a channel and/or signal group to which the channel and/or signal belongs (for example, the group to which the channel and/or signal belongs is notified by the base station and/or determined according to a predetermined rule); a control channel resource group to which a control channel for scheduling the channel and/or signal belongs (for example, the control channel resource group is notified by the base station and/or multiple control resource sets (CORESETs) is divided according to a predetermined rule into groups); a reference signal group where a quasi co-location reference signal of the channel and/or signal is located (for example, a group to which a reference signal belongs is notified by the base station and/or determined according to a predetermined rule); or an antenna group of a communication node corresponding to the channel and/or signal where the communication node is a communication node that transmits the channel and/or signal. The antenna group is, for example, an antenna group of a sending end (that is, the TRP) and/or an antenna group of a receiving end.

In the preceding description, the quasi co-location information includes at least one of a quasi co-location reference signal associated with one type of quasi co-location parameter or one type of quasi co-location parameter, where the one type of quasi co-location parameter includes one or more of the spatial receive parameter, the Doppler shift, the average delay, the Doppler spread, the delay spread or the average gain.

In the preceding description, quasi co-location information associated with an i-th type includes at least one of a quasi co-location reference signal with respect to an i-th type of quasi co-location parameter or an i-th type of quasi co-location parameter, where i includes 1, 2, 3 or 4.

Embodiment Seven

In this embodiment, in one of the following cases, a quasi co-location reference signal of a PDSCH is acquired according to a second-type quasi co-location reference signal.

Case one: A time interval between DCI and the PDSCH is less than a predetermined threshold K.

Case two: The time interval between the DCI and the PDSCH is greater than or equal to the predetermined threshold K and the DCI does not include a TCI.

Optionally, the second-type quasi co-location reference signal may be associated with one CORESET, that is, in case one, the quasi co-location reference signal of the PDSCH is acquired according to the second-type quasi co-location reference signal corresponding to a CORESET latest to the PDSCH and satisfying a predetermined characteristic, and in case two, the quasi co-location reference signal of the PDSCH is acquired according to the second-type quasi co-location reference signal corresponding to a CORESET for scheduling the PDSCH. The second-type quasi co-location reference signal is not related to a demodulation reference signal in DCI in the CORESET, that is, one CORESET corresponds to two types of quasi co-location reference signal. A first-type quasi co-location reference signal satisfies a quasi co-location relationship with the demodulation reference signal in the DCI in the CORESET, which, for example, is referred to as TCI state1. The second-type quasi co-location reference signal is not related to the demodulation reference signal in the DCI in the CORESET and is a quasi co-location reference signal of a demodulation reference signal of the PDSCH in both the preceding two cases, which, for example, is referred to as TCI state2.

Optionally, information about the second-type quasi co-location reference signal may be updated in a media access control-control element (MAC-CE), where the MAC-CE may further carry a CORESET index which indicates that the second-type quasi co-location reference signal corresponding to the CORESET index is updated. When the CORESET is used in case one and a CORESET with a minimum CORESET-ID exists in a time unit latest to the PDSCH, the quasi co-location reference signal of the demodulation reference signal of the PDSCH is obtained according to the information about the second-type quasi co-location reference signal corresponding to the CORESET. When the CORESET is a CORESET including the DCI for scheduling the PDSCH in case two, the quasi co-location reference signal of the demodulation reference signal of the PDSCH is obtained according to the information about the second-type quasi co-location reference signal corresponding to the CORESET.

Optionally, the MAC-CE may not carry the CORESET index. For example, only one piece of information about the second-type quasi co-location reference signal is included in one frequency domain bandwidth. The one piece of information about the second-type quasi co-location reference signal may include one or more second-type quasi co-location reference signal sets.

Optionally, the second-type quasi co-location reference signal may also be updated through the DCI.

Optionally, at least one of the PDSCH, a PUSCH or a PUCCH is scheduled by the DCI.

Optionally, the second-type quasi co-location reference signal is updated by using a predetermined bit field in the DCI. The predetermined bit field includes a TCI bit field in the DCI, or the predetermined bit field is a TCI field in the DCI in case one. In case one, a second-type quasi co-location reference signal indicated by a TCI field in current DCI (for example, in slotn) cannot be used for a current PDSCH (for example, in slotn) and may be used for a quasi co-location reference signal of a PDSCH after a predetermined time after the DCI/PDSCH (for example, slotn+k1).

Optionally, in case one and/or case two, when the DCI and the PDSCH are located in different frequency domain bandwidths such as different bandwidth parts (BWPs) and/or different component carriers (CCs), the second-type quasi co-location reference signal is acquired according to a second-type quasi co-location reference signal in a frequency domain bandwidth where the PDSCH/DCI is located.

Optionally, in case one and/or case two, when the DCI and the PDSCH are located in different frequency domain bandwidths, the second-type quasi co-location reference signal is acquired according to one TCI state activated through the MAC-CE. The one TCI state is acquired through the first-type quasi co-location reference signal activated through the MAC-CE for a first CORESET or the second-type quasi co-location reference signal of the CORESET. The first CORESET is a CORESET with a minimum CORESET-ID in a time unit latest to PDSCH in a frequency domain bandwidth where the PDSCH is located.

Optionally, in case one and/or case two, when the DCI and the PDSCH are located in different frequency domain bandwidths, the second-type quasi co-location reference signal is acquired according to one TCI state activated through the MAC-CE. The one TCI state is acquired through a first one in a TCI state list activated through the MAC-CE for PDSCHs in the frequency domain bandwidth where the PDSCH is located, and TCI states in the activated TCI state list are in a one-to-one correspondence to TCI fields in the DCI.

Embodiment Eight

In this embodiment, a method for determining a parameter of a measurement reference signal is described. The method includes a step described below.

When a first-type parameter of a first measurement reference signal is not configured, the first-type parameter is acquired according to a second measurement reference signal. The first-type parameter includes at least one of a TCI, a scrambling sequence generation parameter or a frequency domain resource.

Optionally, the second measurement reference signal satisfies at least one of the following characteristics: the second measurement reference signal is a measurement reference signal configured with the first-type parameter; or the second measurement reference signal and the first measurement reference signal belong to the same measurement reference signal set.

Optionally, when multiple second measurement reference signals exist, the first-type parameter of the first measurement reference signal is acquired according to one second-type measurement reference signal among the multiple second measurement reference signals, which has a minimum measurement reference signal resource index and/or has a measurement signal resource set index/has a minimum measurement signal resource setting index.

Optionally, all first-type parameters of the first measurement reference signal are acquired according to first-type parameters of the same second measurement reference signal resource, or different first-type parameters of the first measurement reference signal may be acquired according to first-type parameters of different second measurement reference signal resources.

It is to be understood by those having ordinary skill in the art that some or all steps of the preceding method and function modules/units in the preceding system or apparatus may be implemented as software, firmware, hardware and suitable combinations thereof. In the hardware implementation, the division of the preceding function modules/units may not correspond to the division of physical components. For example, one physical component may have multiple functions, or one function or step may be performed jointly by multiple physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile media as well as removable and non-removable media implemented in multiple methods or technologies for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storages, a magnetic cassette, a magnetic tape, magnetic disk storages or other magnetic storage devices or multiple other media that can be used for storing desired information and that can be accessed by a computer. Additionally, as is known to those having ordinary skill in the art, the communication media generally include computer-readable instructions, data structures, program modules or other data in carriers or in modulated data signals transported in other transport mechanisms and may include multiple information delivery media.

We claim:

1. An information element processing method, comprising:
   acquiring quasi co-location information of a first-type information element according to quasi co-location information of a second-type information element in a case where a time interval between control information for scheduling the first-type information element and the first-type information element is less than a predetermined threshold and a predetermined condition is satisfied,
   wherein the predetermined condition comprises first group information corresponding to the first-type information element and second group information corresponding to the second-type information element being the same;
   wherein the first-type information element and the second-type information element at least partially overlap in time domain.

2. The information element processing method of claim 1, wherein the information element comprises at least one of a channel or a signal.

3. The information element processing method of claim 1, wherein i-th group information associated with an i-th type information element comprises an i-th control channel resource group to which a control channel for scheduling the i-th type information element belongs, wherein i is equal to 1 or 2.

4. The information element processing method of claim 1, wherein the second-type information element comprises a second-type channel, the second-type channel including a control channel in a control channel resource with a predetermined control channel resource index in a latest time unit in which there is at least one control channel resource.

5. An information element processing apparatus, comprising a processor and a computer-readable storage medium, wherein the computer-readable storage medium stores an instruction, and the processor, in executing the instruction, is configured to:
   acquire quasi co-location information of a first-type information element according to quasi co-location information of a second-type information element in a case where a time interval between control information for scheduling the first-type information element and the first-type information element is less than a predetermined threshold and a predetermined condition is satisfied,
   wherein the predetermined condition comprises first group information corresponding to the first-type information element and second group information corresponding to the second-type information element being the same;
   wherein the first-type information element and the second-type information element at least partially overlap in time domain.

6. The information element processing apparatus of claim 5, wherein the information element comprises at least one of a channel or a signal.

7. The information element processing apparatus of claim 5, wherein i-th group information associated with an i-th type information element comprises an i-th control channel resource group to which a control channel for scheduling the i-th type information element belongs, wherein i is equal to 1 or 2.

8. The information element processing apparatus of claim 5, wherein the second-type information element comprises a second-type channel, the second-type channel including a control channel in a control channel resource with a predetermined control channel resource index in a latest time unit in which there is at least one control channel resource.

9. A non-transitory computer-readable storage medium, which is configured to store a computer program which, when executed by a processor, causes the processor to:
   acquire quasi co-location information of a first-type information element according to quasi co-location information of a second-type information element in a case where a time interval between control information for scheduling the first-type information element and the first-type information element is less than a predetermined threshold and a predetermined condition is satisfied,
   wherein the predetermined condition comprises first group information corresponding to the first-type information element and second group information corresponding to the second-type information element being the same;
   wherein the first-type information element and the second-type information element at least partially overlap in time domain.

* * * * *